(12) United States Patent
Doner

(10) Patent No.: US 10,984,433 B1
(45) Date of Patent: Apr. 20, 2021

(54) PRICE OPTIMIZATION SYSTEM

(71) Applicant: Skyline Products, Inc., Colorado Springs, CO (US)

(72) Inventor: Brendan S. Doner, Golden, CO (US)

(73) Assignee: Skyline Products, Inc., Colorado Springs, CO (US)

( * ) Notice: Subject to any disclaimer, the term of this patent is extended or adjusted under 35 U.S.C. 154(b) by 0 days.

(21) Appl. No.: 15/961,506

(22) Filed: Apr. 24, 2018

Related U.S. Application Data

(60) Provisional application No. 62/489,173, filed on Apr. 24, 2017, provisional application No. 62/541,486, filed on Aug. 4, 2017.

(51) Int. Cl.
*G06Q 10/00* (2012.01)
*G06Q 30/02* (2012.01)
*G06Q 50/06* (2012.01)
*G06F 17/18* (2006.01)

(52) U.S. Cl.
CPC ......... *G06Q 30/0206* (2013.01); *G06F 17/18* (2013.01); *G06Q 30/0201* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 7,124,121 B1 | 10/2006 | Drescher | |
| 7,287,000 B2 | 10/2007 | Boyd et al. | |
| 7,379,890 B2 | 5/2008 | Myr et al. | |
| 7,523,047 B1 | 4/2009 | Neal et al. | |
| 8,566,143 B2 | 10/2013 | Etzioni et al. | |
| 8,706,311 B2 * | 4/2014 | Kosaka | G06Q 10/06 700/291 |
| 8,972,284 B2 | 3/2015 | Daigle et al. | |
| 2002/0107819 A1 | 8/2002 | Ouimet | |

(Continued)

FOREIGN PATENT DOCUMENTS

WO WO 03/058396 7/2003

OTHER PUBLICATIONS

SAP Secondary Distribution and Fuels Retailing, 2014, Implico. com, http://www.oilandgastechnology.net/sites/default/files/Implico_SAP_Overview_en_j06_screen.pdf, p. 1-20.*

(Continued)

*Primary Examiner* — Joseph M Waesco
(74) *Attorney, Agent, or Firm* — Aspire IP, LLC; Scott J. Hawranek

(57) ABSTRACT

A method for price optimization for a product or service at a store using machine learning is disclosed. The method includes determining a price through a reaction model, positioning model, and a forecast model. The reaction model includes determining the probabilities of a competitors' pricing reaction due to the store's price changes. The positioning model includes determining conditional probabilities for attaining an objective and/or sub-objective based on store and competitor's data. The conditional probabilities are used for generating a price proposal for achieving the objective and/or sub-objective. The forecast model provides a forecast for factors such as volume sale using machine learning.

8 Claims, 18 Drawing Sheets

(56) References Cited

U.S. PATENT DOCUMENTS

| | | |
|---|---|---|
| 2003/0110066 A1 | 6/2003 | Walser et al. |
| 2106/0047608 | 3/2006 | Davis et al. |
| 2009/0099902 A1* | 4/2009 | Chatter .............. G06Q 30/0275 705/14.43 |
| 2009/0254971 A1* | 10/2009 | Herz .................. G06Q 30/0603 726/1 |
| 2010/0235285 A1* | 9/2010 | Hoffberg .............. G06Q 20/401 705/75 |
| 2010/0317420 A1* | 12/2010 | Hoffberg ............... G07F 17/323 463/1 |
| 2011/0004513 A1* | 1/2011 | Hoffberg ................. G07F 17/32 705/14.1 |
| 2011/0246313 A1 | 10/2011 | Daigle et al. |
| 2012/0209660 A1 | 8/2012 | McCaffrey |
| 2012/0284086 A1 | 11/2012 | McCaffrey |
| 2012/0330724 A1 | 12/2012 | McCaffrey |
| 2013/0097664 A1* | 4/2013 | Herz ...................... G06Q 10/10 726/1 |
| 2013/0297428 A1* | 11/2013 | Chatter .................. G06Q 30/00 705/14.71 |
| 2014/0081793 A1* | 3/2014 | Hoffberg ................. G07F 17/32 705/26.3 |
| 2015/0081392 A1* | 3/2015 | Fox .................... G06Q 30/0206 705/7.35 |
| 2017/0098257 A1 | 4/2017 | Keller |
| 2018/0068358 A1* | 3/2018 | Hoffberg ................. G07F 17/32 |

OTHER PUBLICATIONS

Aggarwal et al., "Electricity Price Forecasting in Deregulated Markets: A Review and Evaluation," Electrical Power and Energy Systems, vol. 31, pp. 13-22, 2009.

Amazon Machine Learning, "Machine Learning on AWS", Retrieved from URL: https://aws.amazon.com/machine-learning/, Apr. 24, 2018, 25 pages.

Chiroma et al., "Computational intelligence Techniques with Application to Crude Oil Price Projection: A Literature Survey from 2001-2012," Neural Network World, vol. 23, No. 6, pp. 523-551, 2013.

Jin et al., "Forecasting Natural Gas Prices Using Wavelets, Time Series, and Artificial Neural Networks," PLoS One, vol. 10, No. 11, 2015, 23 pages.

Derakhshan et al., "PriceCast Fuel: Agent eased Fuel Pricing," Advances in Practical Applications of Scalable Multi-Agent Systems. The PAAMS Collection. Lecture Notes in Computer Science, vol. 9662, Springer, Jun. 1-3, 2016, 17 pages.

Google Cloud Machine Learning, "Cloud AI", Retrieved from URL https://cloud.google.com/products/machine-learning/, Apr. 24, 2018, 8 pages.

O. Saglam, "Forecasting USAF JP-8 Fuel Needs," Thesis Submitted to the Department of the Air Force Air University, Air Force Institute of Technology, Mar. 2009, 170 pages.

Kalid et al., "PETRONAS Petrol Station Fuel Consumption Forecast System," Proceedings of the Second International Conference on Artificial Intelligence in Engineering & Technology Aug. 3-5 2004, 5 pages.

Microsoft Machine Learning, "Azure Machine Learning Studio", Retrieved from URL https://azure.microsoft.com/en-us/services/machine-learning-studio/, Apr. 24, 2018, 9 pages.

Negnevitsky et al., "Machine Learning Applications for Load, Price and Wind Power Prediction in Power System," 15th International Conference on Intelligent System Applications to Power Systems, Nov. 8-12, 2009, 6 pages.

Nguyen et al., "Combining the Wavelet Transform and Forecasting Models to Predict Gas Forward Prices," 2008 7th International Conference on Machine Learning and Applications, pp. 311-317, 2008.

Nguyen et al., "Short-Term Electricity Demand and Gas Price Forecast Using Wavelet Transforms and Adaptive Models," Energy, vol. 35, pp. 3674-3685, 2010.

Nguyen et al., "Energy Forward Price Prediction with a Hybrid Adaptive Model," IEEE Symposium on Computational Intelligence for Financial Engineering, May 15, 2009, 6 pages.

Sharma et al., "ANN Approach for Daily Prediction of Gas Load Forecasting," Proceedings of the 5th National Conference INDIACom-2011, Computing for Nation Development, Mar. 10-11, 2011, 5 pages.

Blog—a2i systems a/s, "PriceCast Fuel: Strategic Business Agility", Retrieved from URL: www.a2isystems.com, Sep. 27, 2017, 19 pages.

* cited by examiner

PRICE OPTIMIZATION SYSTEM

CROSS REFERENCE TO RELATED APPLICATION

This application claims the benefit under 35 U.S.C. § 119(e) of U.S. Provisional Application No. 62/489,173, filed Apr. 24, 2017 and this application also claims the benefit under 35 U.S.C. § 119(e) of U.S. Provisional Application No. 62/541,486, filed Aug. 4, 2017, each of the above-identified applications are fully incorporated herein by reference.

BACKGROUND OF THE INVENTION

Field of the Invention

The invention generally relates to a price optimization system, and more particularly to a method and system for price optimization through machine learning.

Discussion of the Background

There are certain price optimization systems in the related art for certain operations (e.g., for a general merchandise store or grocery stores or other facilities).

However, price optimization systems in the related art are not extendible and/or applicable to other operations. For example, retail motor fuel stores (e.g., gas stations) may have different requirements than general merchandise stores. In particular, the price of the main product these stores sell, gasoline, may be announced to the world and competitors through large, visible signs and/or displays placed in accessible locations (e.g., the side of the road such that the signs may act as advertisement and enticement for motorists or other purchasers of the fuel store's product).

There are deficiencies to the price optimization systems in the related art. For example, while there have been attempts to create a price optimization routine for the related motor fuel stores, they have not been highly successful for a variety of reasons, including the frequency of which retail fuel prices change in certain markets, the inaccuracy of predicted fuel volume sales for the day, and the required flexibility of using a wide range of data inputs to the price algorithm.

SUMMARY OF THE INVENTION

There is a need for a price optimization system that addresses the deficiencies and problems in the related art.

One advantage of an embodiment is to make use of machine learning algorithms and processing to process a wide range of data feeds for a price optimizing system. The price optimizing system may be adapted to various different types of operations using data feeds relevant to the specific types of operations. The price optimizing system learns over time as additional data feeds are progressively added to the system through artificial intelligence, which would be progressively accurate with its predictions.

Another advantage of an embodiment is to provide a price optimizing system using machine learning algorithms and processing in a distributed computing environment. The processing of the price optimizing system may be performed at a remote computer system, such as cloud computing, and may use a hosted computing service, such as a third-party computer system.

Yet another advantage of an embodiment is to provide a price optimizing system for retail fuel price optimization using machine learning algorithms and processing. The system provides quick autonomous updates to accurate fuel pricing based on a number of relevant variables and factors, which may change through the course of a single day, allowing updates of fuel price at a store location throughout the day.

To achieve these and other advantages, as embodied and broadly described, a method for price optimization for a product or service at a store comprises obtaining prices, the prices including a price for each day of a set of days within a time period for each of the store and one or more of competitors' stores; obtaining volume data for the set of days for the store and the competitors' stores; determining, using computational equipment, one or more variables for the set of days from data for the product or service, wherein the variables are used for determining an objective for the product or service; determining one or more positions for the set of days for the store compared with at least a subset of the competitors' stores; determining conditional probabilities for attaining the objective based on the prices, the volume data, the variables, and the positions; and generating one or more price proposals for the store and competitors' reactions to each of the price proposals based on the conditional probabilities for attaining the objective. The product or service is fuel. The determining the conditional probabilities for attaining the objective includes determining prior probabilities for attaining the objective and determining posterior probabilities based on the variables related to one or more of cost factors, market factors, and average factors for the competitors. The price for each day include determining a weighted price for the day based on one or more prices within the day and a time for the one or more prices within the day. The method further comprises removing one or more of the positions based on a determination of an unattainableness of the positions. The objective includes one of a volume forecast and a target volume. The method further comprises determining a volume baseline from the volume data adjusted by seasonality, wherein the conditional probabilities are based on the volume baseline.

In another embodiment, a method for price optimization for a product or service at a store comprises obtaining prices within a time period for each of the store and one or more of competitors' stores; determining one or more variables for changes or movements of the prices for the set of days from data for the product or service for the store and the competitors' stores; and determining probabilities for competitors' price change in relation to the store's price change based on the variables. The product or service is fuel. The variables include a price change of a price from a previous price and a lag time between competitors' price change to the store's price change. The variables are grouped by ranges.

In another embodiment, a method for price optimization for a product or service at a store comprises obtaining prices, the prices including a price for each day of a set of days within a time period for each of the store and one or more of competitors' stores; obtaining volume data for the set of days for the store and the competitors' stores; determining, using computational equipment, one or more variables for the set of days from data for the product or service, wherein the variables are used for determining an objective for the product or service; determining one or more positions for the set of days for the store compared with at least a subset of the competitors' stores; determining conditional probabilities for attaining the objective based on the prices, the volume data, the variables, and the positions; determining probabilities for competitors' price change in relation to the store's price change based on the variables; generating one or more price proposals for the store and competitors' reactions to each of the price proposal based on the conditional probabilities for attaining the objective; and generating an output for the probabilities for the competitors' price change in relation to the store's price change. The method further comprises generating an output for the one or more price proposals. The product or service is fuel. Again, in this embodiment, the objective is based on either profit or volume from the good or service. The objective includes a sub-objective based on a margin of the price proposal and a frequency of a price of the price proposal in the prices. The output includes lag time for the competitors' reactions. However, other objectives as discussed herein can also be utilized, e.g., volume. The output includes one or more groups of output based on a degree of a trend in cost change. The method further comprises processing the prices through machine learning for a generation of volume forecasts based on one or more of variables including store number, date, day of week, week, month, holiday, store price, lowest competitor price, average competitor price, highest competitor price, closest competitor prices, differentials with competitor prices, actual cost, actual margin, actual cost change, volume average, last year volume, and volume. The method further comprises filtering at least one of the prices and the variables based on seasonality.

The present disclosure can provide a number of advantages depending on the particular aspect, embodiment, and/or configuration. These and other advantages will be apparent from the disclosure. Additional features and advantages may be learned by the practice of the invention.

Figure 1:
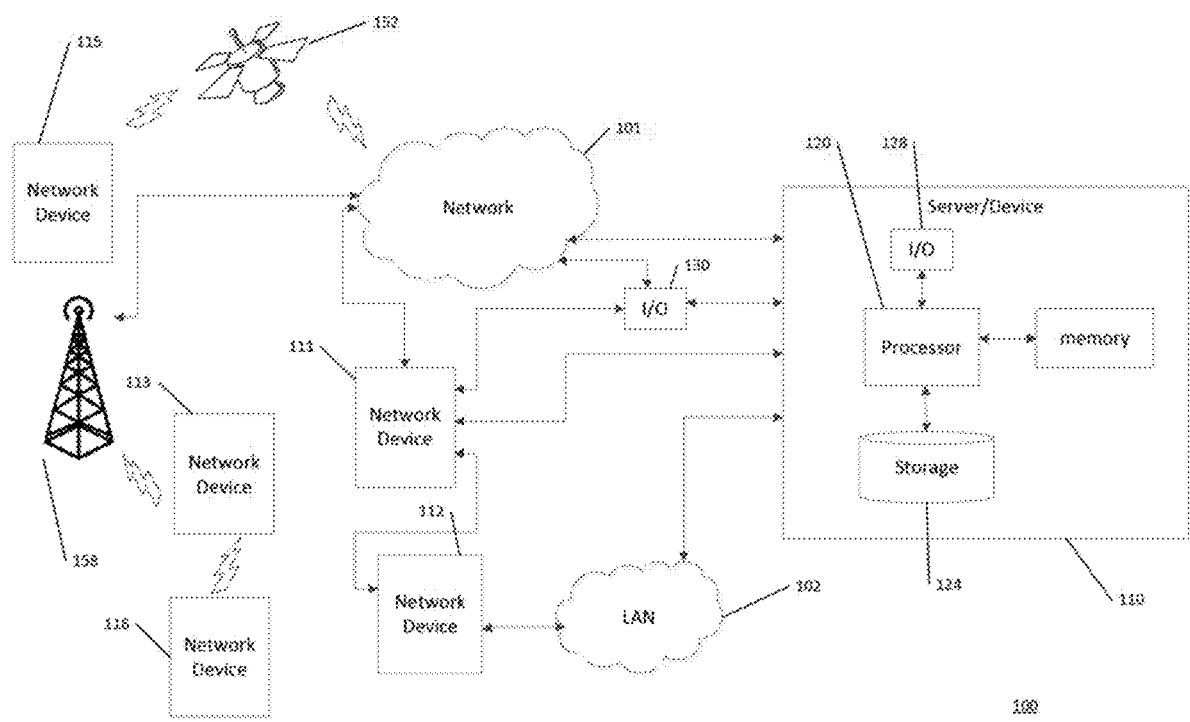
FIG. 1 illustrates an exemplary block diagram of a communication network for a price optimization system according to an embodiment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

For the purposes of promoting an understanding of the principles of the present disclosure, reference will now be made to the exemplary embodiments illustrated in the drawing(s), and specific language will be used to describe the same.

In order to more fully appreciate the present disclosure and to provide additional related features, the following references are incorporated therein by reference in their entirety:

(1) U.S. Pat. No. 7,287,000 to Boyd et al. relates to a configurable pricing system that allows users to define or modify data used to analyze, evaluate, improve, and design pricing changes according to the user's need. A Graphical user interface or some other type of user interface allows the user to access and review various data to be used during pricing optimization. The user may then modify this data as needed to improve the pricing evaluation, such as defining sales or pricing trends, or relationships between the product of interest and other competing items. The user interface may further display changes in pricing and the effects of the pricing changes, as caused by the user's changes. The interface may also allow the user to modify the mathematical model to be used during price optimization, as well as define variables, constraints, and boundaries to be considered during the price optimization.

(2) U.S. Pat. No. 7,379,890 to Myr et al. relates to a computer-based method and system that accomplishes automatic optimization of a preferred merchandising figure of merit like revenue, profit, etc. by concurrent optimization of prices and in-store promotion schedules for groups of interrelated products in a supermarket or in a chain of supermarkets. The basis of the system is a statistical model that combines effects of prices, promotion schedules and other factors that could influence demands, and produces a flexible nonparametric predictive demand function that can be optimized simultaneously in prices and promotion schedules. The system generates demand predictions for groups of interrelated products by applying data mining procedures to historical database that contains sales data along with various sales conditions, adjusting statistical predictive demand models, and then optimizing them in prices and promotion schedules. The user can interact with the system by selecting and customizing optimization and prediction scenarios provided by the system, and by requesting customized reports with results of particular optimization and prediction schemes.

(3) U.S. Pat. No. 7,523,047 to Neal et al. relates to a method for determining a preferred set of prices for a plurality of products. Generally, a sales model is created. A cost model is also created. A preferred set of prices for the plurality of products based on the sales model and cost model is then generated. An apparatus for computing a preferred set of prices for a plurality of products is provided. An econometric engine for modeling sales as a function of price to create a sales model is provided. A financial model engine for modeling costs to create a cost model is provided. An optimization engine is coupled to the econometric engine and financial model engine to receive input from the econometric engine and financial model engine, wherein the optimization engine generates the preferred set of prices.

(4) U.S. Pat. No. 8,972,284 to Daigle et al. relates to a system for controlling outdoor price signs for fuel products and includes a control center. The control center determines a price for a fuel product for a number of fuel stores. The control center receives a variety of data that may have an impact on fuel prices, including competitive data from a neighborhood store. The control center has a number pricing formulas and applies a selected formula to set a fuel price at one of the fuel stores. The price is sent to a store controller. The store controller passes the fuel price information to a point of sale device that updates a pump price and an outdoor controllable sign. The sign includes feedback that it not only received the correct price but that it correctly displays the price and the price is legible.

(5) U.S. Pat. Pub. No. 2002/0107819 to Ouimet relates to a software method for controlling the optimization of a planning model that uses historical sales data to predict optimal prices and similar factors for meeting a number of business goals. Unlike previous systems that allow a user to model prices and other factors based on physical constraints, the present invention allows the optimization to occur against the background of one or more strategic objectives. Such objectives, such as price image, are not set by physical constraints but instead are imposed by the user with the notion that they will provide a strategic and ultimately an economic advantage. The system allows the analysis of the costs and benefits of such management imposed strategic objectives.

(6) U.S. Pat. Pub. No. 2006/0047608 to Davis et al. relates to a market-based software system that will help user-retailers manage price and inventories more effectively. The system will take advantage of available price and sales data to provide pricing recommendations that will achieve a retail user's objectives. The system will offer a solution that will allow for pricing improvement shortly after installation by utilizing data that is readily available. The system will recommend price changes that help a user achieve specified objectives such as contribution, sales volume, desired margins, and the like. The system can also collect and process price and sales data on an ongoing basis, which can enable improved estimates of customer price sensitivity and performance on a category-by-category basis. This data can be used to improve further pricing decisions.

(7) U.S. Pat. Pub. No. 2012/0209660 to McCaffrey relates to a computer-implemented method of generating fuel price data for each of a plurality of associated retail fuel sites, the method being implemented in a computer comprising a memory in communication with a processor. The method comprises receiving, as input to the processor, a total volume fuel sales target for the plurality of associated retail fuel sites and processing, by the processor, the total volume fuel sales target for the plurality of associated retail fuel sites to generate volume fuel sales targets for each of the plurality of associated retail fuel sites. The volume fuel sales targets for each of the plurality of associated retail fuel sites is processed, by the processor, to generate the fuel price data.

(8) U.S. Pat. Pub. No. 2012/0284086 to McCaffrey relates to a computer-implemented method of generating fuel price data for a retail fuel site, the method being implemented in a computer comprising a memory in communication with a processor. The method comprises receiving, as input to the processor, data indicating a relationship between fuel sales and store sales at said retail fuel site and receiving, as input to the processor, data indicating a relationship between fuel price and fuel sales at said retail fuel site. The data indicating a relationship between fuel sales and store sales at said retail fuel site and said data indicating a relationship between fuel price and fuel sales at said retail fuel site are processed by the processor to generate said fuel price data.

(9) U.S. Pat. Pub. No. 2012/0330724 to McCaffrey relates to a computer-implemented method of selecting a fuel type for a retail fuel site, the method being implemented in a computer comprising a memory in communication with a processor. The method comprises receiving, as input to the processor, data indicating a relationship between fuel price and fuel sales for a plurality of fuel types and receiving, as input to the processor, data indicating a property of the retail fuel site. The data indicating a relationship between fuel price and fuel sales for each of the plurality of fuel types is processed by the processor and the data indicating a property of the retail fuel site to select the fuel type for the retail fuel site.

(10) U.S. Pat. Pub. No. 2015/0081392 to Fox et al. relates to a method of generating fuel price data for a retail fuel site. The method comprises receiving relationship data indicating a relationship between the retail fuel site and a competitor retail fuel site and receiving fuel price data for the competitor retail fuel site. The fuel price data for the competitor retail fuel site is processed to generate estimated fuel price data for the competitor retail fuel site and the fuel price data for the retail fuel site is generated based upon the relationship data and the estimated fuel price data.

(11) U.S. Pat. Pub. No. 2017/0098257 to Keller relates multiple retail fuel stores are optimized using system having a computer in communication with a database. Remote computing devices are connected to the first computer by a communication system. Electronic signs receive an instruction over the communication system. The system creates a correlation matrix having fuel prices for the retail fuel stores, a reward discount, and competitor fuel prices, a profit for the fuel prices for each of the retail fuel stores, and a volume. It also creates an economic model that receives a number of correlation coefficients from the correlation matrix at the first computer. A multi-store optimization process configures the economic model to determine optimal fuel prices for retail fuel stores based on a total multi-store profit.

The present disclosure can provide a number of advantages depending on the particular aspect, embodiment, and/or configuration. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "module," as used herein, refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation or technique.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

Embodiments herein presented are not exhaustive, and further embodiments may be now known or later derived by one skilled in the art.

Functional units described in this specification and figures may be labeled as modules, or outputs in order to more particularly emphasize their structural features. A module and/or output may be implemented as hardware, e.g., comprising circuits, gate arrays, off-the-shelf semiconductors such as logic chips, transistors, or other discrete components. They may be fabricated with Very-large-scale integration (VLSI) techniques. A module and/or output may also be implemented in programmable hardware such as field programmable gate arrays, programmable array logic, programmable logic devices or the like. Modules may also be implemented in software for execution by various types of processors. In addition, the modules may be implemented as a combination of hardware and software in one embodiment.

An identified module of programmable or executable code may, for instance, include one or more physical or logical blocks of computer instructions that may, for instance, be organized as an object, procedure, or function. Components of a module need not necessarily be physically located together but may include disparate instructions stored in different locations which, when joined logically together, include the module and achieve the stated function for the module. The different locations may be performed on a network, device, server, and combinations of one or more of the same. A module and/or a program of executable code may be a single instruction, or many instructions, and may even be distributed over several different code segments, among different programs, and across several memory devices. Similarly, data or input for the execution of such modules may be identified and illustrated herein as being an encoding of the modules, or being within modules, and may be embodied in any suitable form and organized within any suitable type of data structure.

In one embodiment, the system, components and/or modules discussed herein may include one or more of the following: a server or other computing system including a processor for processing digital data, memory coupled to the processor for storing digital data, an input digitizer coupled to the processor for inputting digital data, an application program stored in one or more machine data memories and accessible by the processor for directing processing of digital data by the processor, a display device coupled to the processor and memory for displaying information derived from digital data processed by the processor, and a plurality of databases or data management systems.

In one embodiment, functional block components, screen shots, user interaction descriptions, optional selections, various processing steps, and the like are implemented with the system. It should be appreciated that such descriptions may be realized by any number of hardware and/or software components configured to perform the functions described. Accordingly, to implement such descriptions, various integrated circuit components, e.g., memory elements, processing elements, logic elements, look-up tables, input-output devices, displays and the like may be used, which may carry out a variety of functions under the control of one or more microprocessors or other control devices.

In one embodiment, software elements may be implemented with any programming, scripting language, and/or software development environment, e.g., Fortran, C, C++, C#, COBOL, Apache Tomcat, Spring Roo, Web Logic, Web Sphere, assembler, PERL, Visual Basic, SQL, SQL Stored Procedures, AJAX, extensible markup language (XML), Arduino, Flex, Flash, Java, .Net and the like. Moreover, the various functionality in the embodiments may be implemented with any combination of data structures, objects, processes, routines or other programming elements.

In one embodiment, any number of conventional techniques for data transmission, signaling, data processing, network control, and the like as one skilled in the art will understand may be used. Further, detection or prevention of security issues using various techniques known in the art, e.g., encryption, may be also used in embodiments of the invention. Additionally, many of the functional units and/or modules, e.g., shown in the figures, may be described as being "in communication" with other functional units and/or modules. Being "in communication" refers to any manner and/or way in which functional units and/or modules, such as, but not limited to, input/output devices, computers, laptop computers, PDAs, mobile devices, smart phones, modules, and other types of hardware and/or software may be in communication with each other. Some non-limiting examples include communicating, sending and/or receiving data via a network, a wireless network, software, instructions, circuitry, phone lines, Internet lines, fiber optic lines, satellite signals, electric signals, electrical and magnetic fields and/or pulses, and/or the like and combinations of the same.

By way of example, communication among the users, subscribers and/or server in accordance with embodiments of the invention may be accomplished through any suitable communication channels, such as, for example, a telephone network, an extranet, an intranet, the Internet, cloud based communication, point of interaction devices (point of sale device, personal digital assistant, cellular phone, kiosk, and the like), online communications, off-line communications, wireless communications, RF communications, cellular communications, Wi-Fi communications, transponder communications, local area network (LAN) communications, wide area network (WAN) communications, networked or linked devices and/or the like. Moreover, although embodiments of the invention may be implemented with TCP/IP communications protocols, other techniques of communication may also be implemented using IEEE protocols, IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein.

In embodiments of the invention, the system provides and/or receives a communication or notification via the communication system to or from an end user. The communication is typically sent over a network, e.g., a communication network. The network may utilize one or more of a plurality of wireless communication standards, protocols or wireless interfaces (including LTE, CDMA, WCDMA, TDMA, UMTS, GSM, GPRS, OFDMA, WiMAX, FLO TV, Mobile DTV, WLAN, and Bluetooth technologies), and may be provided across multiple wireless network service providers. The system may be used with any mobile communication device service (e.g., texting, voice calls, games, videos, Internet access, online books, etc.), SMS, MMS, email, mobile, land phone, tablet, smartphone, television, vibrotactile glove, voice carry over, video phone, pager, relay service, teletypewriter, and/or GPS and combinations of the same.

Reference will now be made in detail to an embodiment of the present invention, an example of which is illustrated in the accompanying drawings.

FIG. 1 illustrates an exemplary block diagram of a communication network according to an embodiment.

Referring to FIG. 1, communication network 100 includes one or more networks, including wide-area network 101, e.g., the Internet, company or organization intranet, and/or sections of the Internet (e.g., virtual private networks (VPNs), cloud, and the deep web), and local-area network 102, e.g., interconnected computers localized at a geographical and/or organization location and ad-hoc networks connected using various wired means, e.g., Ethernet, coaxial, fiber optic, and other wired connections, and wireless means, e.g., Wi-Fi, Bluetooth, and other wireless connections. Communication network 100 includes a number of network devices 111, 112, 113, 115 and 116 that are in communication with the other devices through the various networks 101 and 102 and through other means, e.g., direct connection through an input/output port of a network device 130, direct connection through a wired or wireless means, and indirect connection through an input-output box, e.g., a switch.

Network devices 111, 112, 113, 115, and 116 which may also connect through the networks 101 and 102 using various routers, access points, and other means. For example, network device 113 wirelessly connects to a base station 158, which acts as an access point to the wide area network 101. Base station 158 may be a cellular phone tower, a Wi-Fi router or access point, or other devices that allow a network device, e.g., wireless network device 113, to connect to a network, e.g., wide area network 101, through the base station 158. Base station 158 may be connected directly to network 101 through a wired or wireless connection or may be routed through additional intermediate service providers or exchanges. Network device 113 connecting through base station 158 may also act as a mobile access point in an ad-hoc or other wireless network, providing access for network device 115 through network device 113 and base station 158 to network 101.

In some scenarios, there may be multiple base stations, each connected to the network 101, within the range of network device 113. In addition, a network device, e.g., network device 113, may be travelling and moving in and out of the range of each of the multiple base stations. In such case, the base stations may perform handoff procedures with the network device and other base stations to ensure minimal interruption to the network device's connection to network 101 when the network device is moved out of the range of the handling base station. In performing the handoff procedure, the network device and/or the multiple base stations may continuously measure the signal strength of the network device with respect to each base station and handing off the network device to another base station with a high signal strength to the network device when the signal strength of the handling base station is below a certain threshold.

In another example, a network device, e.g., network device 115, may wirelessly connect with an orbital satellite 152, e.g., when the network device is outside of the range of terrestrial base stations. The orbital satellite 152 may be wirelessly connected to a terrestrial base station that provides access to network 101 as known in the art.

In other cases, orbital satellite 152 or other satellites may provide other functions such as global positioning and providing the network device with location information or estimations of location information of the network device directly without needing to pass information to the network 101. The location information or estimation of location information is known in the art. The network device may also use geolocation methods, e.g., measuring and analyzing signal strength, using the multiple base stations to determine location without needing to pass information to the network 101. In an embodiment, the global positioning functionality of the orbital satellite 152 may use a separate interface than the communication functionality of the orbital satellite 152 (e.g., the global position functionality uses a separate interface, hardware, software, or other components of the network device 113 than the communication functionality). In another embodiment, the orbital satellite with the global position functionality is a physically separate satellite from the orbital satellite with communication functionality.

In one scenario, network device, e.g., network device 112, may connect to wide area network 101 through the local area network 102 and another network device, e.g., network device 110. Here, the network device 110 may be a server, router, gateway, or other devices that provide access to wide area network 101 for devices connected with local area network 102.

In an embodiment, one or more of the network devices 111, 112, 113, 115, and 116 may be a computer, laptop, handset or other mobile device, smart device and/or object (e.g., Internet of Things (IoT) object), watch or other wearable device, vehicle, smart sign or other display, and other smart or connected item, and/or a combination thereof. In an embodiment, the network devices 111, 112, 113, 115, and 116 may be connectable with and/or part of a routed network (e.g., an addressed network (e.g., an Internet Protocol (IP) network)). The network devices 111, 112, 113, 115, and 116 may have one or more addresses with the network 101 (e.g., IPv4 and/or IPv6 addresses) and/or addresses with one or more subnet of the network 101 for accessing and/or be accessed by the network 101 (e.g., VPN, LAN, or other subnet addresses). In an embodiment, computing and/or other functions of the network devices 111, 112, 113, 115, and 116 may be distributed to other locations and/or devices.

The other locations and/or devices may be separately addressable with the network 101.

Figure 2:
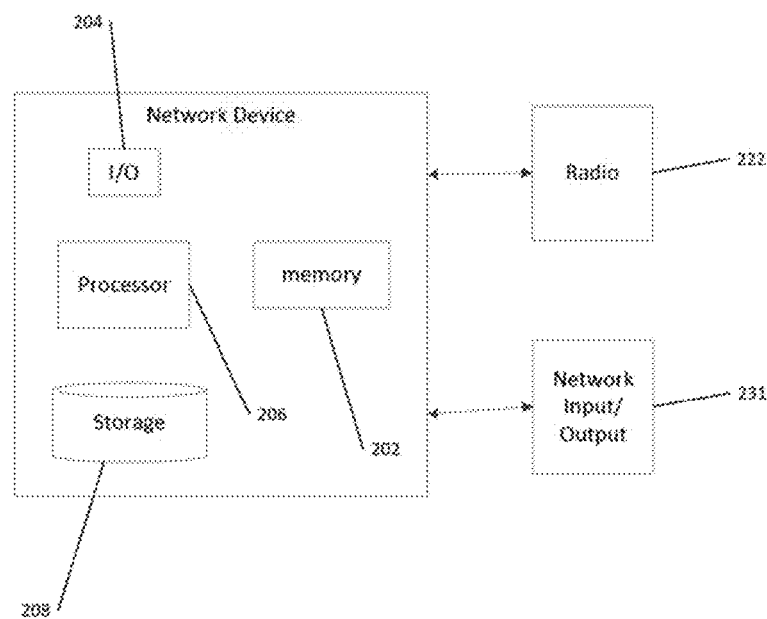
FIG. 2 illustrates an exemplary block diagram of a network device for a price optimization system according to an embodiment.

FIG. 2 illustrates an exemplary block diagram of a network device for a price optimization system according to an embodiment.

Referring to FIG. 2, a network device 200 may include electronic components that include one or more processors 206, storages 208, memories 202, and input and output interfaces 204. A riser device may or may not contain all of the above components depending on the purpose and use of the device. For example, the electronic components of a network device 200 may only be a dummy terminal that only requires an input and an output interface to send the input and receive the output from a device that contains a processor for processing the input and outputs.

In a further embodiment, the network device 200 may be connected with one or more displays, peripheral devices, and input devices. Displays may be visible screens, audible speakers, Braille text devices, or other devices that output information to a user. Peripheral devices may include printers, external storages, and other devices. Input devices may include keyboards, mice, and other input devices to input information to the device 200. The one or more devices may be connected with or integral to the device 200. For example, a network device 200 may have an integrated display which may pull up an input device, e.g., a soft keyboard, in a touch screen of the display. Another device may have a separate display monitor connected to a display port, e.g., VGA, DVI, and HDMI, of the network device 200 and a hardware keyboard connected to the network device 200 through an input port, e.g., keyboard port and USB. The displays, peripheral devices, and input devices facilitate local user input and output at the location of the network device 200.

In an embodiment, network device 200 may include network input and output interfaces 204 for communication through communication network 101 as one of the network devices 111, 112, 113, 115, and 116. Network interfaces 231 may include wired and wireless interfaces, as described with respect to FIG. 1, that connect the network device 200 to a network or other devices. The network interfaces 231 are used to receive input (e.g., instructions) to the network device 200 and transmit output (e.g., device status and updates) from the network device 200 to the network or other devices.

In an embodiment, network device 200 may include a radio 222 (e.g., a transceiver). Radio 222 is configured for local (e.g., short-range) communication with local devices (e.g., other network devices within a vicinity of network device 200) without the need to communicate through the network 101. In an embodiment, the radio 222 may be used in complement to the network input and output interfaces 231. For example, radio 222 may be used exclusively for communication with the corresponding network device while other communications are sent and received through the network input and output interfaces 231. In another example, radio 222 may be used as a back-up communication option (e.g., if network 101 is unavailable).

In an embodiment, communications from the networks or other information may be displayed and/or communicated in the display, communicated through the communication network 101 (e.g, viewable at a web browser, cell phone alerts), or communicated through other means as known now or may be later derived. In another embodiment, the displayed and/or communicated information may include information gathered by and/or regarding other network devices (e.g., network devices 111, 112, 113, 115, and 116) and aggregated to provide more substantive overview and/or convenient information.

In an embodiment, the network device 200 may raise an alert to a user defined method (e.g., email, text message, phone call, app) of the status of the network device 200 (e.g., possible malfunction or maintenance issues).

Figure 3:
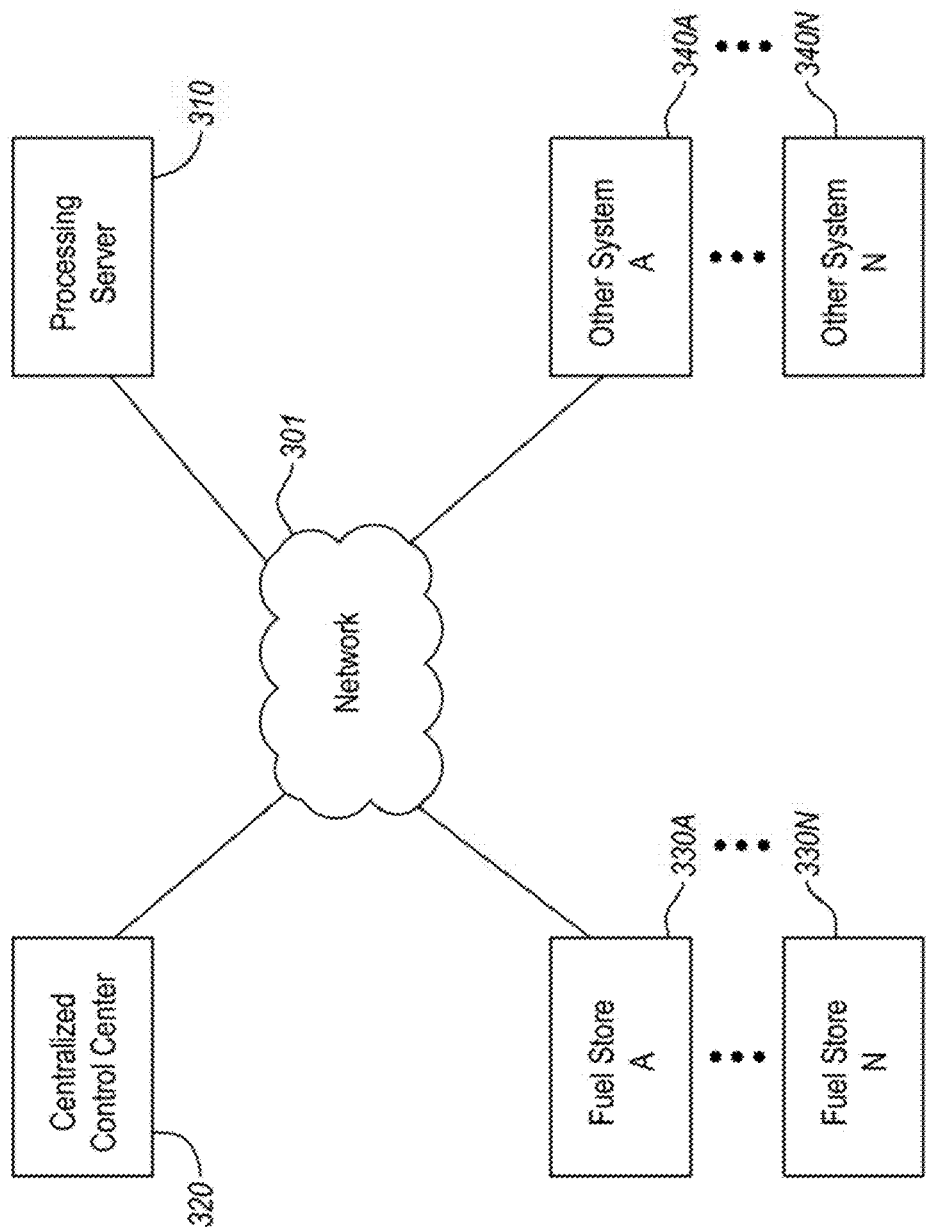
FIG. 3 illustrates an exemplary block diagram of a price optimization system according to an embodiment.

FIG. 3 illustrates an exemplary block diagram of a price optimization system according to an embodiment.

The price optimization system may include one or more of a processing server 310, a centralized control center 320, one or more operated stores (e.g., fuel stores 330A-N), and one or more other systems 340A-N, which may be connected with and through network 301.

In an embodiment, the processing server 310 may include computational equipment for processing price optimization. The processing server 310 may be accessible at a remote location from the network 301 (e.g., network device 110) or may be locally available (e.g., co-located) to one or more of the fuel stores 330A-330N or the centralized control center 320. In an embodiment, the processing server 310 may be one or more hosted servers by third party services providing computational equipment and/or processing through the network 301 (e.g., hosted computing, cloud computing, and/or distributed computing).

In an embodiment, the price optimization system may include the centralized control center 320. The centralized control center 320 may contain or may access and provide various information as input for the price optimization processing (e.g., through the network 301) at the processing server 310. For example, the centralized control center 320 may be available or accessible at a company's main location for a company that operates a number of stores at various geographical locations (e.g., fuel stores 330A-N) and has data related to the company's historical and/or aggregate information to the goods for the price optimization (e.g., historical price information, aggregate volume data, aggregate competitor information, etc.) or information regarding each of the operated stores (e.g., store information, local price and volume information, local competitor information, etc.).

In an embodiment, one or more of the operated stores may lack a server and/or computational processing facility; in such a case, the centralized control center 320 may gather and provide the relevant local information to the processing service 310. In another embodiment, the centralized control center 320 may be co-located with an operated store or may be operated by a cloud or distributed manner (e.g., one or more network devices 111, 112, 113, 115, and 116 (such as laptops or smart phones) providing control and/or information at various remote locations). In a further embodiment, the centralized control center 320 may not be available or needed (e.g., when the operated stores are individually operated and/or loosely affiliated, so centralized and/or aggregate information may not be available).

In an embodiment, the operated stores (e.g., fuel stores 330A-N) may receive predictions and/or other outputs directly from the processing server 310 or may receive the predictions and/or other outputs provided from centralized control center 320, which receives such outputs from the processing server 310. In an embodiment, the centralized control center 320 (or locally at the operated stores) may further process the outputs prior to the outputs being actually used at the operated stores. For example, a price prediction provided by the processing server 310 may be checked and verified for pricing error (e.g., if the price prediction is outside of certain ranges or limits) or compliance with company and/or regulatory rules policies. In another example, the price prediction may need to be adjusted as needed (e.g., the price at a particular store to be further lowered from the predicted price to incentivize further traffic to the particular store as compared to other operated stores in the area).

In an embodiment, the operated stores may include a server or network device (e.g., network devices 111, 112, 113, 115, and 116) for communication (through network 301) and/or controlling the various other devices at the operated stores (e.g., point-of-sale (POS) systems and/or signs). In another embodiment, the various other devices at the operated stores may be network devices (e.g., network devices 111, 112, 113, 115, and 116) themselves.

In an embodiment, the other systems 340A-N may provide other relevant inputs to the processing server 310 and/or through the centralized control center 320 or the operated stores) for the price optimization processing. For example, the other systems 340A-N may include real-time trading data (e.g., spot prices of the good (such as provided by New York Mercantile Exchange (NYMEX)), government data, map and/or local data (e.g., updated competitor location and information including competitor pricing (which may be provided by third-party commercial applications through subscription services, websites, databases, and/or other repositories) and/or other information. In an embodiment, the processing service 310 and/or the centralized control center 320 or the operated stores may provide predicator or other processed outputs to the other systems 340A-N (e.g., price updates, trading information, government reports, or other information).

In an embodiment, the third-party or purchased data may include information of varying reliability as compared with the store and/or centralized information. For example, the OPIS data-feed may include information and data for fuel purchases by drivers using fleet cards (e.g., UPS drivers). Such information may contain updated time, location, and unit price of fuel purchased for a fleet that is operated nationwide. In some circumstances, such information and data may be considered more reliable and/or updated as compared with individual store information or competitor store information that is gathered by other sources (e.g., relying on human on-site observation and entry into the system). In an embodiment, the system may allow preference for such information and/or data for the price optimization system.

Figure 4:
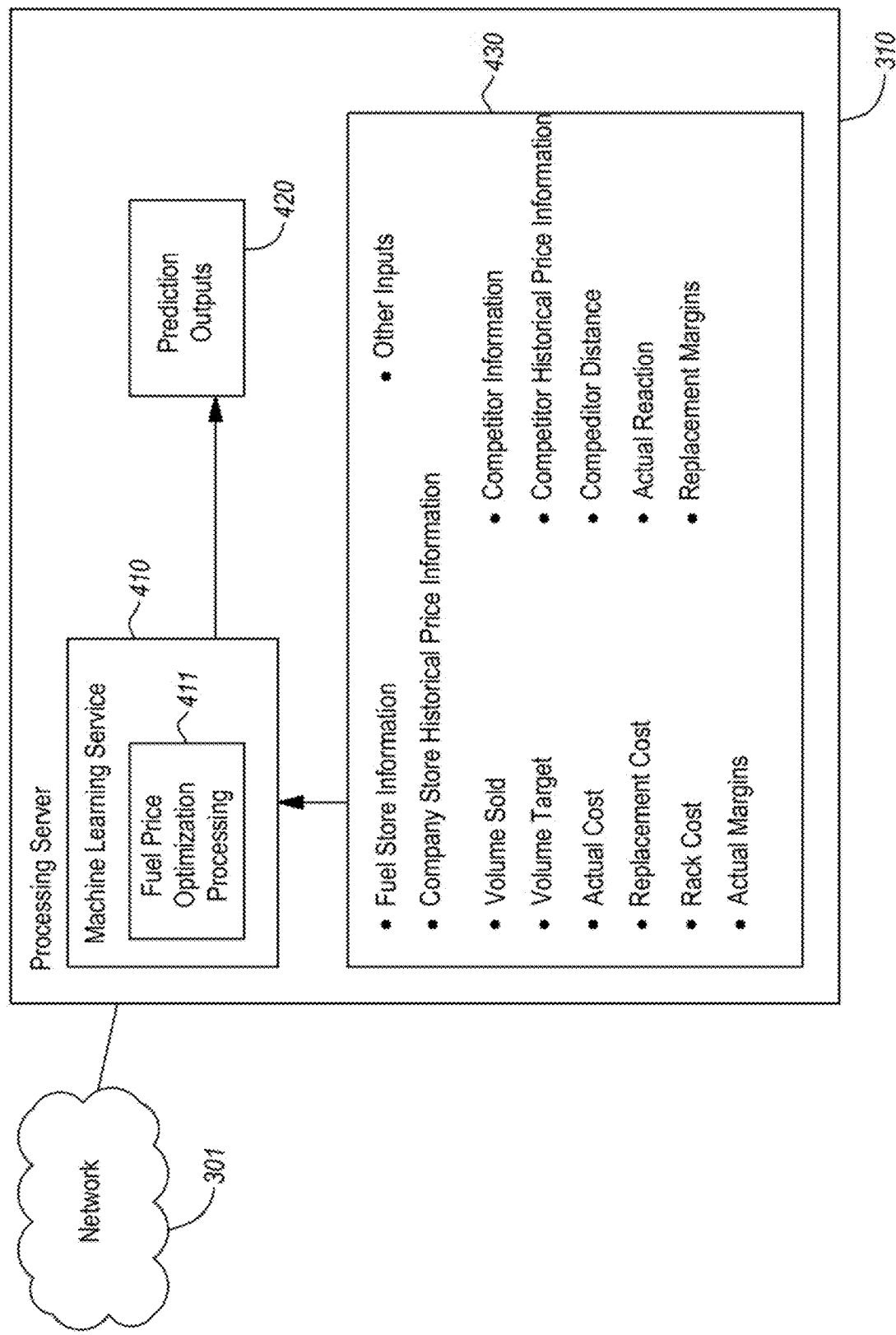
FIG. 4 illustrates an exemplary block diagram of a processing service for a price optimization system according to an embodiment.

FIG. 4 illustrates an exemplary block diagram of a processing service for a price optimization system according to an embodiment.

In an embodiment, machine learning algorithm and processing may be incorporated into the realm of price optimization (e.g., retail fuel price optimization). The machine learning processing may be performed in a hosted server (e.g., processing server 310), which may provide rapid scaling of processing power when large data sets are being processed. For example, the hosted machine learning service (e.g., machine learning service 410) may be available in a cloud computing environment through the Internet or a network 301. Current hosted machine learning service providers include Amazon (see "Amazon Machine Learning", available at hattps://aws.amazon.com/machine-learning/, herein fully incorporated by reference); Microsoft (see "Machine Learning", available at https://azure.microsoft-.com/en-us/services/machine-learning/, herein fully incorporated by reference); and Google (see "Google Cloud Machine Learning at Scale", available at https://cloud-.google.com/products/machine-learning/, herein fully incorporated by reference).

In an embodiment, the rapid scaling of processing power enables optimized prices to be generated more rapidly. The rapid generation of optimized prices allows fuel retailers to take advantage of day part pricing, where they can price fuel at several retail price levels throughout the day, for example during the morning commute, over lunch, and during the evening commute.

Machine learning processing used in this context also allows for ongoing improved accuracy of predicted fuel volume sales, and optimal fuel gross profit.

In an embodiment, machine learning processing allows for the flexibility on a site-by-site basis to use various data feeds in the optimized price algorithm, such as replacement fuel cost or actual fuel cost, historical market position against all competitors or a subset of competitors, and volumes sold over a set same day number of weeks in history with an overlay of volume goals for those days. This flexibility is valuable, for example, because some retail fuel locations are high volume sites where multiple fuel loads are delivered each day; for these locations, replacement fuel cost is best when calculating optimized prices. In another example, other retail fuel locations are in more remote areas where fuel loads are only delivered once or twice per week; for these locations, actual fuel cost is best when calculating optimized prices. In a further example, a store may also price relative to the competition (e.g., when cost is rising vs. when cost is falling).

The machine learning price optimization algorithm may present a fuel price to the end user (e.g., fuel stores 330A-330N or centralized control center 320), who then decides whether or not to adopt that price. The end user review step may be removed from the pricing process, so the price optimization algorithm automatically adjusts the price without human intervention. Limits, safeguards, and/or other checks may be put in place to ensure that the predicted price makes sense and/or to catch machine error. For example, the optimization price may be checked within boundaries such as price relative to previous price, relative to actual cost, and/or relative to a specific competitor. The system may be configured so that if the optimization price is within these set boundaries, the price is automatically sent to the site, but if the optimization price is outside one of the boundaries, an end user must review.

In an embodiment, the price optimization processing (e.g., fuel price optimization processing 411) may itself be operated as a service (e.g., software as a service (SaaS)) to various companies or operators in the same and/or different industry or goods.

In an embodiment, various relevant information (e.g., inputs 430) may be provided as inputs to the machine learning service 410. The machine learning service 410 may be preprogrammed and may use one or more learning models (e.g., Bayes, Naïve-Bayes, regression learning, etc.) for processing the inputs. The machine learning service 410 may be trained with the provided inputs iteratively and perform a price optimization processing (e.g., fuel price optimization processing 411) for one or more prediction outputs 420.

For example, a fuel price optimization service may be provided with one or more of following inputs 430:

Store Identifier
  Unique ID
    Branding
    Location
    Number of Pumps
    Grade of Fuel
Company Store price history with time/date stamps—
  Dynamic
  Weighted Average
  Granular data
Volumes sold
  Actual Volumes Sold/Grade/[Day, Hr, Week]
Volume target
  User Defined [Grade/[Day, Hr, Week]
Actual Cost
  Accounting System—weighted
Replacement Cost—Components
  Components—Freight, Rack Cost, Tax, Allowance, Sales Tax, Prepaid Sales Tax, Other Costs
  Quoted
Rack Cost
  Component of replacement cost
Actual Margins
  Derived from current prices standard accounting
Replacement Margins
  Derived from current prices standard accounting
Competitor name
  Unique ID
    Branding
    Location
    Number of Pumps
    Grade of Fuel
Competitor price history with time/date stamps
  Weighted Average
  Granular data
Competitor distance from Company Store
  Miles or Kilometers
Actual Reaction
Special events
Store attributes
Competitor attributes
Other category sales besides fuel
Weather history
Weather forecast
Weather conditions
Disruptive events such as construction projects
Margin targets
The predicted outputs may include one or more of the following:
Volumes that will be sold in the future
Profit that will be achieved
Predicted pricing behavior of competitors under different market conditions, including when costs are rising or falling, e.g. who will lead, who will follow
Optimized price based on emphasis on volumes or margins, in alignment with corporate strategy on a per store basis In an embodiment, one or more of the inputs may be used as input for the fuel price optimization processing 411 to generate one or more of the outputs (e.g., an M-input to N-output system). In an embodiment, the prediction outputs 420 may be processed for each of the operated stores, a group of stores (e.g., grouped by geographic area, proximity to population, or other parameters), and/or all stores as a group.

Experimental data indicates that the fuel price optimization processing 411 provides accuracy and other improvements to the predications over an algorithmic approach.

In an embodiment, the predication outputs 420 may be further processed by other algorithmic, heuristic, machine learning, and/or other processing (e.g., the processing as disclosed in the '257 Publication).

Figure 5:
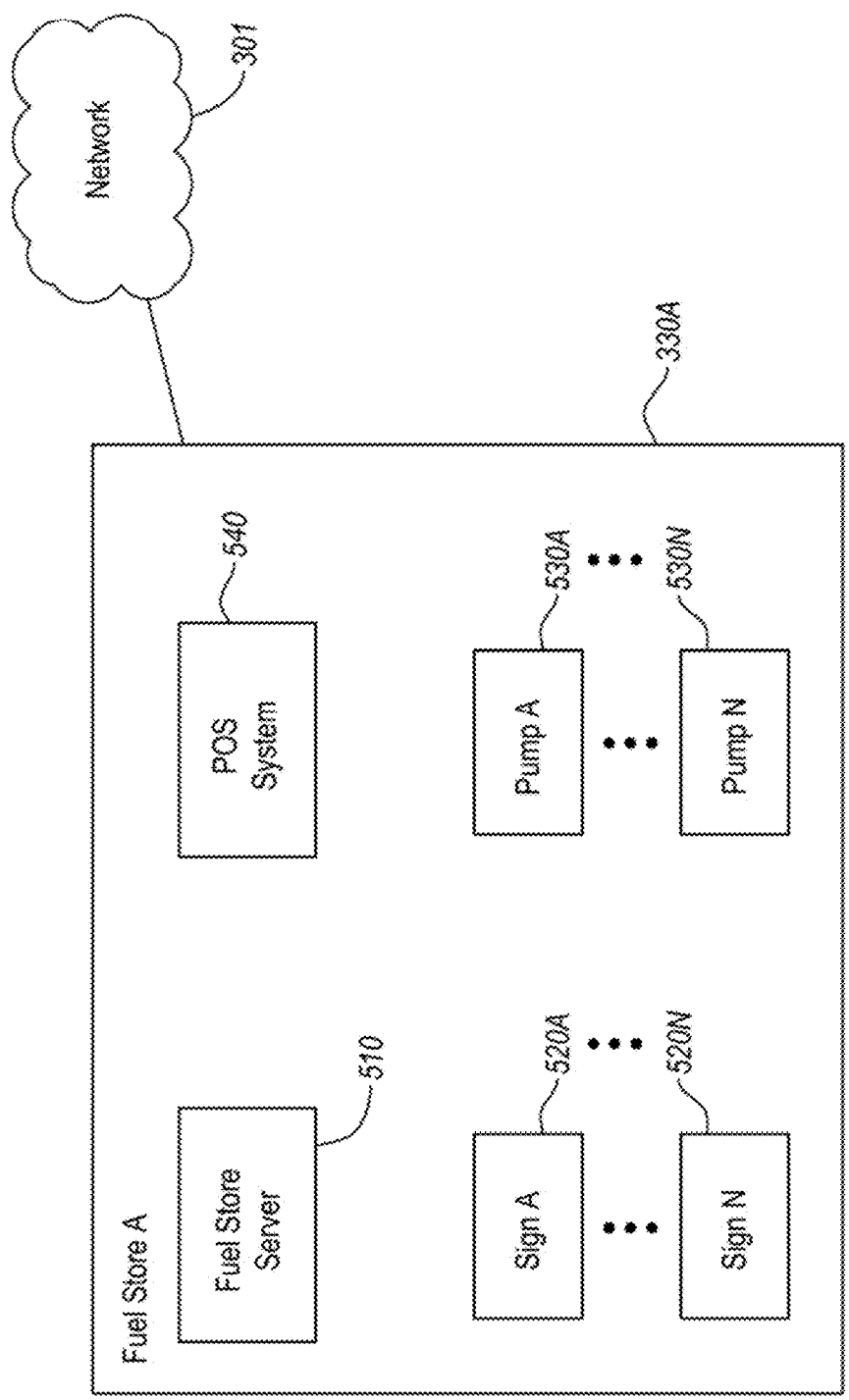
FIG. 5 illustrates an exemplary block diagram of a fuel store for a price optimization system according to an embodiment.

FIG. 5 illustrates an exemplary block diagram of a fuel store for a price optimization system according to an embodiment.

The fuel store 330A may include one or more of a server 510, POS system 540, signs 520A-N (e.g., for displaying prices and/or other information), and/or fuel pumps 530A-N.

It is noted that each of these items of the fuel store 330A may require to be updated with certain data based on the prediction (e.g., current pricing information). Further, the data (e.g., current pricing information) may need to be consistent within the fuel store 330A. The server 510 may be used as a data collection and distribution point to transmit consistent information to the various items of the fuel store 330A. In an embodiment, one or more of the items of the fuel store 330A may be network devices (e.g., network devices 111, 112, 113, 115, and 116) able to communication over the network 101.

Figure 6:
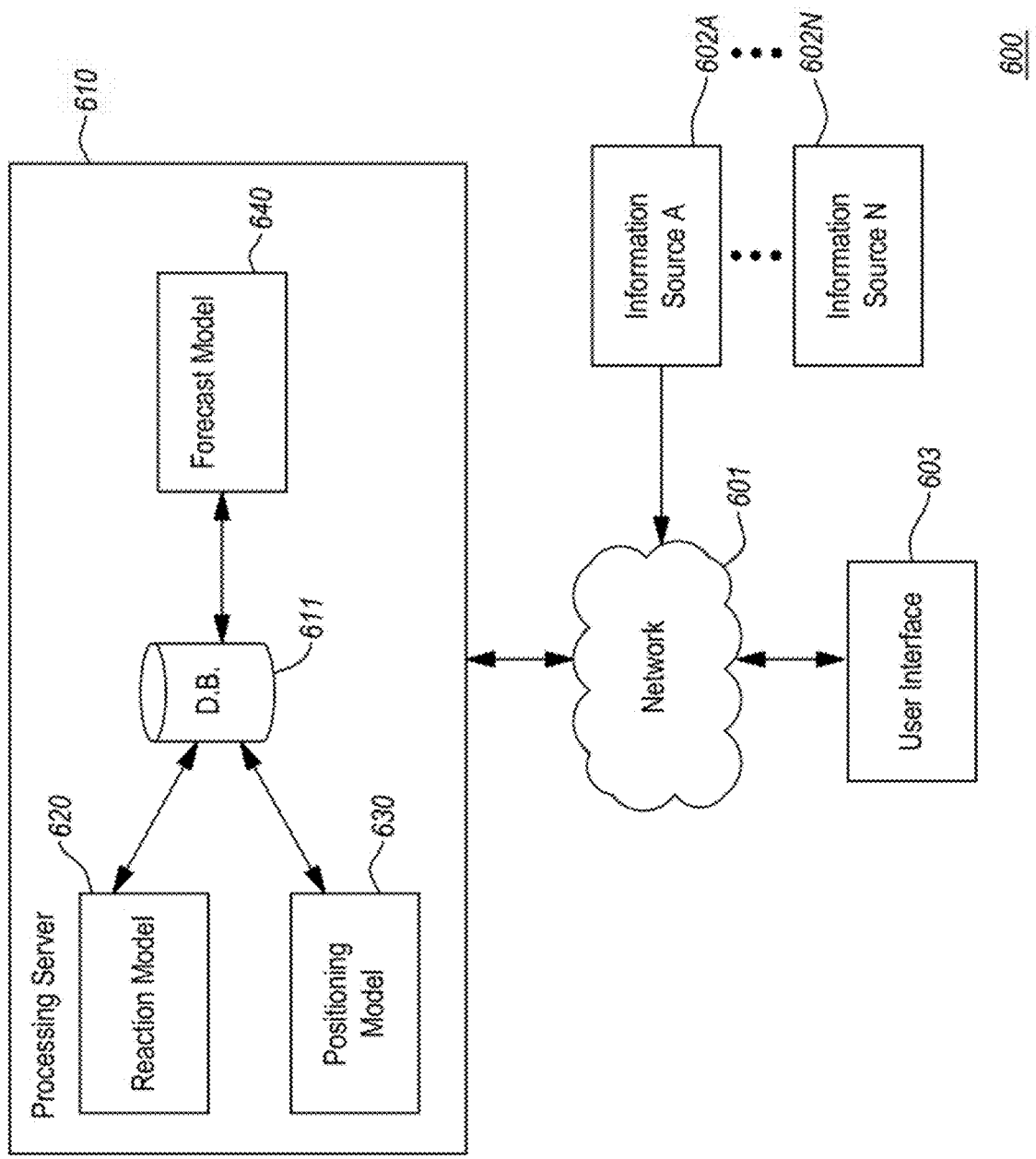
FIG. 6 illustrates an exemplary block diagram of a price optimization system according to an embodiment.

FIG. 6 illustrates an exemplary block diagram of a price optimization system according to an embodiment.

In an embodiment, the price optimization system 600 includes processing server 610 in communication with network 601 to receive information from information sources 602A-602N for processing. In an embodiment, the processing server may include the processing of one or more of a reaction model 620, positioning model 630, and/or forecast model 640. The processing server may include a database 611 for storing and retrieving received information from information sources 602A-602N and/or processed data by reaction model 620, positioning model 630, and forecast model 640. In an embodiment, a user may request and/or retrieve processed information using user interface 603 (e.g., a graphical user interface (GUI)).

In an embodiment, the information sources 602A-N may include the information sources as discussed with respect to FIGS. 3-5. In an embodiment, the processing service 610 (including the processing of the reaction model 620, positioning model 630, and/or forecast model 640) may be distributed across multiple servers (including third-party servers and/or machine processing (e.g., cloud computing services)).

In an embodiment, a reaction model 620 may be used to predict a competitor's price movement as a function of another price movement (e.g., a response or partial response reactive to the user's or another's store's price movement). Further, the reaction model 620 may be used to predict the expected price move and/or the timing of the expect price move. In an embodiment, the reaction model 620 may be a probability model (e.g., Bayes probability model) based on known historical reactive price movement information (e.g., how a competitor's price moved when the user's store's price moved).

In an embodiment, a positional model 630 may be used to determine and/or predict information (e.g., price) for an expectation of achieving an objective for the sales of a product or service. In a further embodiment, the positional model 630 may determine and recommend and/or select a preferable or optimal price for the product or service for achieving the objective and/or including other sub-objectives (e.g., based on the expectation of achieving such objective or sub-objectives). The positional model 630 may base its determination for achieving the objective on factors such as a set of market conditions that may include cost trends and/or street price trends.

In an embodiment, the forecast model 640 may be used to determine and/or predict a forecast of one or more attributes related to the sale of the product or service. For example, the forecast model 640 may be used for volume forecast in predicting a sale volume of a product in the future (e.g., 28 days into the future). In an embodiment, the forecast model 640 may use the predicted information (e.g., price) from the positional model 630 for the forecast. In an embodiment, machine learning techniques may be used in the forecast model 640, which may include using a set or subset of known data (e.g., one or more of inputs 430) for the model.

As discussed previously in this disclosure, it is beneficial to optimize the price of a product or service at a time period, so the profit potential or other goals can be maximized. For example, it would be advantageous to adjust the price of gasoline fuel for a time period (e.g., for a day, hours, or even minutes) such that sales volume may increase or that profit may be maximized, while such price adjustment would not trigger adverse competitor's reaction (e.g., leading to a price war where profit cannot be sustained) or affecting future profitability (e.g., affecting consumer's future adverse choice to a degree that would defeat the goal). According to an embodiment, certain predictors or variables related to the product or service pricing and/or volume may be used to predict and/or provide certain basis for predicting price of the product or service.

Figure 7:
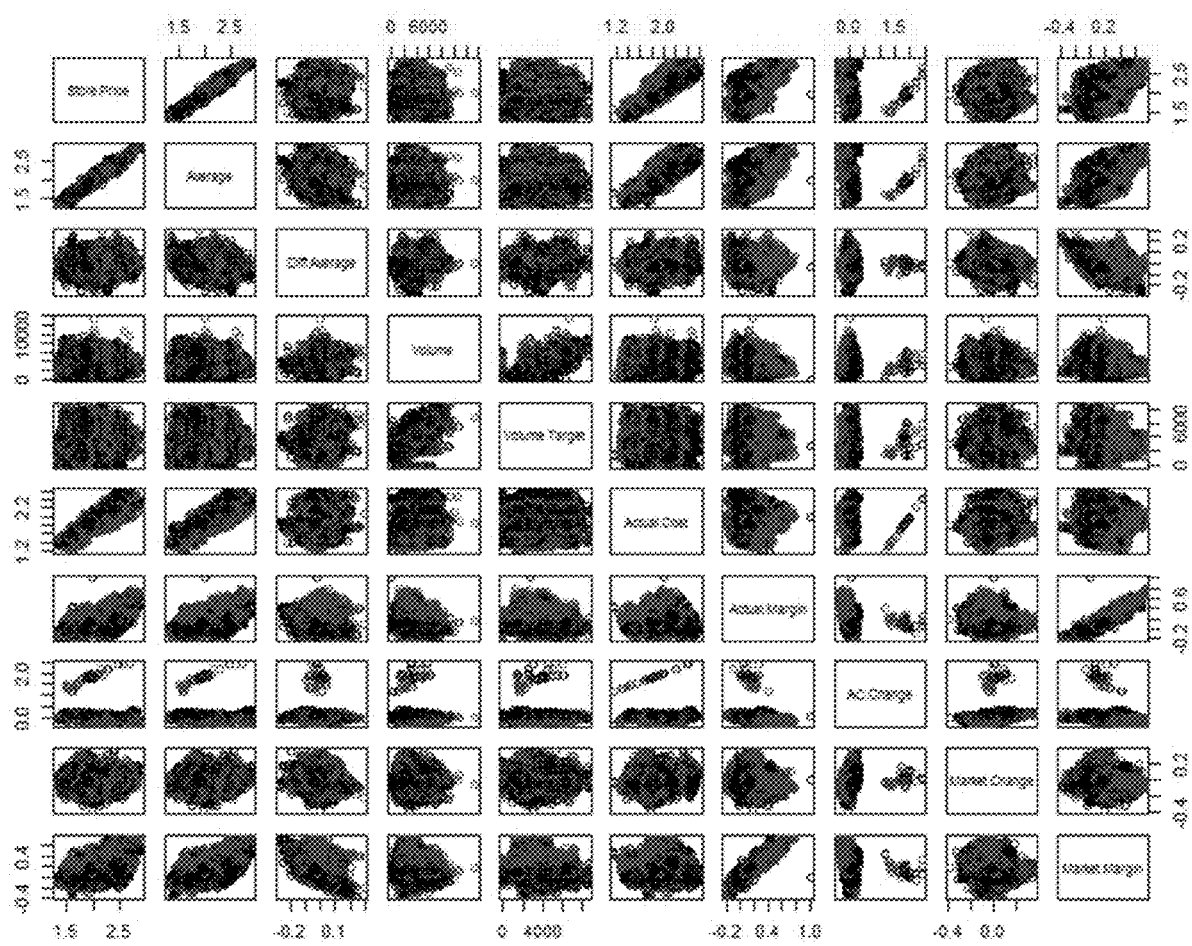
FIG. 7 illustrates relationship graphs between predictors related to gasoline fuel pricing in a particular market.

FIG. 7 illustrates relationship graphs between predictors related to gasoline fuel pricing in a particular market.

Data over a period of time were gathered for a particular store (along with other stores including competitor's stores) in a market that includes data for certain variables or predictors related to the store or the market. Referring to FIG. 7, certain predictors (diagonal cells (1,1) to (10,10)) were used: store price (e.g., price at a particular store); average price (e.g., average price of the market); difference average (e.g., difference between individual store's price to the average price); volume; volume target, actual cost (e.g., actual cost of fuel); actual margin; actual cost change; market change; and market margin. The non-diagonal cells illustrate the relationship plot between two of the predictors of the same row and column. For example, cell (1,2) plots the relationship of the store price (y-axis) vs the average price (x-axis). In another example, cell (2,1) plots the relationship of the average price (y-axis) vs the store price (x-axis).

It is noted that while certain predictor pairs have observable relationship (e.g., store price and the average price), other predictor pairs are not particularly related. It is particularly noted that there is little observable relationship between price and volume.

It is also noted that these predictors are not an exhaustive list of predictors for price optimization systems and methods according to embodiments of the invention. Other predictors and/or variables may be used (including variables and other adjustments disclosed herein).

Table 1A is a table listing predictors and cross accuracy error delta on a target volume and a volume forecast using a standard regression. Table 1B is a table listing predictors and prediction accuracy on a target volume and a volume forecast using a standard regression.

TABLE 1A

| | Predictor | Delta.Target | Delta.Forecast | Difference |
|---|---|---|---|---|
| 1 | Diff. Average | 0.0259153488320088 | 0.013074316533531 | −0.01284103 |
| 2 | Diff. Lowest | 0.0258986516234306 | 0.0131737669341389 | −0.01272488 |
| 3 | Diff.Highest | 0.0262080421037538 | 0.0132515230043200 | −0.01295652 |
| 4 | Store.Price | 0.026255959168677 | 0.0133186568568779 | −0.01293730 |
| 5 | RC.Move | 0.0261747220629899 | 0.0133198641119833 | −0.01285486 |
| 6 | AC.Move | 0.0262414230697594 | 0.0133208899538687 | −0.01292053 |
| 7 | Market.Move | 0.0262601714428475 | 0.0133269836177135 | −0.01293319 |
| 8 | AC.Change | 0.0262636213438364 | 0.0133270976931541 | −0.01293652 |
| 9 | RC.Change | 0.0262637557524997 | 0.0133279318410651 | −0.01293582 |
| 10 | Average | 0.0262352976732045 | 0.0133280122888795 | −0.01290729 |
| 11 | Lowest | 0.0262259812506062 | 0.01332811016687 | −0.01289787 |
| 12 | Month | 0.0261097694350965 | 0.0133282332996211 | −0.01278154 |
| 13 | Spread | 0.0262492691438442 | 0.0133285146685066 | −0.01292075 |
| 14 | Week | 0.0262553716946059 | 0.0133285156693126 | −0.01292686 |
| 15 | Highest | 0.0262405096719701 | 0.0133286603002411 | −0.01291185 |
| 16 | Date | 0.0261243761571721 | 0.0133287970623146 | −0.01279558 |
| 17 | Replacement.Cost | 0.0260425831028434 | 0.0133288682194513 | −0.01271371 |
| 18 | Season | 0.0262267301910113 | 0.0133289440992758 | −0.01289779 |
| 19 | Year | 0.026059907067563 | 0.0133292121001681 | −0.01273069 |
| 20 | Day.Avg | 0.0259599310398266 | 0.013329224616338 | −0.01263071 |
| 21 | Forecast.Day | 0.0259598715873446 | 0.0133292390799449 | −0.01263063 |
| 22 | Day.Avg | 0.0261836253056219 | 0.0133292479099401 | −0.01285438 |
| 23 | Day.Percent | 0.0254477355145946 | 0.0133292690638447 | −0.01211847 |
| 24 | Market.Change | 0.0262639940803844 | 0.0133292846296069 | −0.01293471 |
| 25 | Actual.Cost | 0.0261880701378182 | 0.0133293017396764 | −0.01285877 |

TABLE 1B

| | Predictor | Prediction.Accuracy.Target | Prediction.Accuracy.Forecast | Difference |
|---|---|---|---|---|
| 1 | Diff. Average | 0.5698082 | 0.5499360 | −0.01987221 |
| 2 | Diff.Lowest | 0.5629774 | 0.5472167 | −0.01576077 |
| 3 | Diff. Highest | 0.5604685 | 0.5309181 | −0.02952041 |
| 4 | Store.Price | 0.5648489 | 0.5157109 | −0.04913793 |
| 5 | AC.Move | 0.5648489 | 0.5118669 | −0.05298202 |

TABLE 1B-continued

| | Predictor | Prediction.Accuracy.Target | Prediction.Accuracy.Forecast | Difference |
|---|---|---|---|---|
| 6 | Average | 0.5645151 | 0.5101536 | −0.05436146 |
| 7 | Lowest | 0.5633381 | 0.5093848 | −0.05395332 |
| 8 | Highest | 0.5651542 | 0.5074264 | −0.05772781 |
| 9 | Day.Percent | 0.5833116 | 0.5073789 | −0.07593267 |
| 10 | Actual.Cost | 0.5648758 | 0.5073330 | −0.05754272 |
| 11 | Market.Change | 0.5648489 | 0.5073330 | −0.05751583 |
| 12 | Day | 0.5648489 | 0.5073315 | −0.05751741 |
| 13 | Year | 0.5344758 | 0.5073315 | −0.02714435 |
| 14 | Day.Avg | 0.5606710 | 0.5070167 | −0.05365434 |
| 15 | Forecast.Day | 0.5606710 | 0.5070167 | −0.05365434 |
| 16 | RC.Move | 0.5648489 | 0.5067303 | −0.05811855 |
| 17 | Market.Move | 0.5648489 | 0.5060643 | −0.05878454 |
| 18 | Season | 0.5648489 | 0.5055945 | −0.05925437 |
| 19 | Date | 0.5454892 | 0.5038275 | −0.04166172 |
| 20 | RC.Change | 0.5648489 | 0.5031109 | −0.06173800 |
| 21 | Week | 0.5648489 | 0.5027344 | −0.06211450 |
| 22 | Spread | 0.5648489 | 0.5021649 | −0.06268400 |
| 23 | AC.Change | 0.5648489 | 0.5018659 | −0.06298298 |
| 24 | Month | 0.5706466 | 0.5002428 | −0.07040382 |
| 25 | Replacement.Cost | 0.5490139 | 0.4997872 | −0.04931669 |

Data over a period of time were gathered for a particular store (along with other stores including competitor's stores) in a market that includes data for certain variables or predictors related to the store or the market. The predictors include difference average (e.g., difference between individual store's price to the average price), difference lowest (e.g., the difference of the lowest of the individual store's price to the average price, difference highest (e.g., difference of the highest of the individual store's price to the average price); store price; replacement cost movement (e.g., a direction (e.g., positive, negative, or flat) and/or degree of movement of the cost to replace a given volume of fuel (e.g., depending on the contract of the supplier and other variables)); actual cost movement (e.g., a direction (e.g., positive, negative, or flat) and/or degree of movement of the actual cost of a given volume of fuel (e.g., depending on the contract of the supplier and other variables)); market price movement; actual cost change; replacement cost change; average price; lowest price (e.g., lowest of individual store's prices); price spread; price by week; highest price; price by date; replacement cost; price by season; price by year; day average price; forecast day price; day price; day price percentage; market price change; and actual cost.

The cross validation error delta were calculated for each of the predictors to a target volume (e.g., certain (e.g., set) volume of fuel to be sold) and a volume forecast (e.g., a forecasted (e.g., likely) volume of fuel to be sold)

Table 2A is a table listing predictors (where the predictors data are filtered by seasonality) and cross accuracy error delta on a target volume and a volume forecast using a standard regression sorted by target top predictors. Table 2B is a table listing predictors (where the predictor data are filtered by seasonality) and prediction accuracy on a target volume and a volume forecast using a standard regression sorted by target top predictors.

TABLE 2A

| | Predictor | Delta. Target | Delta. Forecast | Difference |
|---|---|---|---|---|
| 23 | Day.Percent | 0.0254477355145946 | 0.0133292690638447 | −0.01211847 |
| 2 | Diff.Lowest | 0.0258986516234306 | 0.0131737669341389 | −0.01272488 |
| 1 | Diff.Average | 0.025915349 | 0.013074316533531 | −0.01284103 |
| 21 | Forecast.Day | 0.0259598715873446 | 0.0133292390799449 | −0.01263063 |
| 20 | Day.Avg | 0.0259599310398266 | 0.013329224616338 | −0.01263071 |
| 17 | Replacement.Cost | 0.0260425831028434 | 0.0133288682194513 | −0.01271371 |
| 19 | Year | 0.026059907067563 | 0.0133292121001681 | −0.01273069 |
| 12 | Month | 0.0261097694350965 | 0.0133282332996211 | −0.01278154 |
| 16 | Date | 0.0261243761571721 | 0.0133287970623146 | −0.01279558 |
| 5 | RC.Move | 0.0261747220629899 | 0.0133198641119833 | −0.01285486 |
| 22 | Day.Avg | 0.0261836253056219 | 0.0133292479099401 | −0.01285438 |
| 25 | Actual.Cost | 0.0261880701378182 | 0.0133293017396764 | −0.01285877 |
| 3 | Diff.Highest | 0.0262080421037538 | 0.0132515230043200 | −0.01295652 |
| 11 | Lowest | 0.0262259812506062 | 0.01332811016687 | −0.01289787 |
| 18 | Season | 0.0262267301910113 | 0.0133289440992758 | −0.01289779 |
| 10 | Average | 0.0262352976732045 | 0.0133280122888795 | −0.01290729 |
| 15 | Highest | 0.0262405096719701 | 0.0133286603002411 | −0.01291185 |
| 6 | AC.Move | 0.0262414230697594 | 0.0133208899538687 | −0.01292053 |
| 13 | Spread | 0.0262492691438442 | 0.0133285146685066 | −0.01292075 |
| 14 | Week | 0.0262553716946059 | 0.0133285156693126 | −0.01292686 |
| 4 | Store.Price | 0.026255959168677 | 0.0133186568568779 | −0.01293730 |
| 7 | Market.Move | 0.0262601714428475 | 0.0133269836177135 | −0.01293319 |
| 8 | AC.Change | 0.0262636213438364 | 0.0133270976931541 | −0.01293652 |
| 9 | RC.Change | 0.0262637557524997 | 0.0133279318410651 | −0.01293582 |
| 24 | Market.Change | 0.0262639940803844 | 0.0133292846296069 | −0.01293471 |

TABLE 2B

| | Predictor | Prediction.Accuracy.Target | Prediction.Accuracy.Forecast | Difference |
|---|---|---|---|---|
| 9 | Day.Percent | 0.5833116 | 0.5073789 | −0.07593267 |
| 24 | Month | 0.5706466 | 0.5002428 | −0.07040382 |
| 1 | Diff.Average | 0.5698082 | 0.5499360 | −0.01987221 |
| 8 | Highest | 0.5651542 | 0.5074264 | −0.05772781 |
| 10 | Actual.Cost | 0.5648758 | 0.5073330 | −0.05754272 |
| 4 | Store.Price | 0.5648489 | 0.5157109 | −0.04913793 |
| 5 | AC.Move | 0.5648489 | 0.5118669 | −0.05298202 |
| 11 | Market.Change | 0.5648489 | 0.5073330 | −0.05751583 |
| 12 | Day | 0.5648489 | 0.5073315 | −0.05751741 |
| 16 | RC.Move | 0.5648489 | 0.5067303 | −0.05811855 |
| 17 | Market.Move | 0.5648489 | 0.5060643 | −0.05878454 |
| 18 | Season | 0.5648489 | 0.5055945 | −0.05925437 |
| 20 | RC.Change | 0.5648489 | 0.5031109 | −0.06173800 |
| 21 | Week | 0.5648489 | 0.5027344 | −0.06211450 |
| 22 | Spread | 0.5648489 | 0.5021649 | −0.06268400 |
| 23 | AC.Change | 0.5648489 | 0.5018659 | −0.06298298 |
| 6 | Average | 0.5645151 | 0.5101536 | −0.05436146 |
| 7 | Lowest | 0.5633381 | 0.5093848 | −0.05395332 |
| 2 | Diff.Lowest | 0.5629774 | 0.5472167 | −0.01576077 |
| 14 | Day.Avg | 0.5606710 | 0.5070167 | −0.05365434 |
| 15 | Forecast.Day | 0.5606710 | 0.5070167 | −0.05365434 |
| 3 | Diff.Highest | 0.5604685 | 0.5309181 | −0.02952041 |
| 25 | Replacement.Cost | 0.5490139 | 0.4997872 | −0.04931669 |
| 19 | Date | 0.5454892 | 0.5038275 | −0.04166172 |
| 13 | Year | 0.5344758 | 0.5073315 | −−0.02714435 |

Using data as discussed with respect to Tables 2A and 2B, the data may be further filtered by seasonality. For example, it is noted that gasoline volume may be affected by seasonality (e.g., where gasoline purchase volumes rise in certain seasons of the year such as when university students arrive for the beginning of the school year in college towns, or when snowbird tourists arrive in warm climate cities). Therefore, a way to filter out the seasonality may be to look at the monthly average volume as the basis for the daily average (e.g., the daily average for a day of the week in a month). In an embodiment, the filtering may be performed according to the following code:

```
Adding volume forecast and achievement metrics
position.base <- position. base %>%
Determine the daily average based on month and day of the week.
  group_by(Store.Number, Year, Month, Day) %>%
  mutate(Day.Avg = mean(Volume)) %>%
  group_by(Store.Number) %>%
  mutate(Volume.Forecast.Week =
##This calculates the average volume sold by week over the last four weeks. This
helps to filter out the seasonality of volumes.
      (lag(Volume,1) +lag(Volume,2) +lag(Volume,3) +lag(Volume,4) +
        lag(Volume,5) +lag(Volume,6) +30lag(Volume,7) +lag(Volume,8) +
        lag(Volume,9) +lag(Volume,10) +lag(Volume,11) +lag(Volume,12) +
        lag(Volume,13) +lag(Volume,14) +lag(Volume,15) +lag(Volume,16) +
        lag(Volume,17) +lag(Volume,18) +lag(Volume,19) +lag(Volume,20) +
        lag(Volume,21) +lag(Volume,22) +lag(Volume,23) +lag(Volume,24) +
        lag(Volume,25) +lag(Volume,26) +lag(Volume,27) +lag(Volume,28))/
      4,
    Volume.Day.Percent = Day.Avg/Volume.Forecast.Week,
    Volume.Forecast.Day = Volume.Day.Percent * Volume.Forecast.Week,
    Volume.Forecast.Attainment = Volume/Volume.Forecast.Day,
    Volume.Forecast.Error = Volume.Forecast.Day - Volume,
    RMSE = sqrt(sum(Volume.Forecast.Error^2, na.rm=TRUE)/(n( )-7)),
    RMSE.Percent = RMSE / mean(Volume)) %>%
ungroup( ) %>%
filter(!is.na(Volume.Forecast.Day)) %>%
mutate(Avg.RMSE = mean(RMSE.Percent),
    Avg.Company.Volume = mean(Volume),
    Normalized.Volume = Avg.Company.Volume*Volume.Forecast.Attainment,
    Spread = Highest-Lowest,
    Achieved.Volume.Forecast =
      ifelse(Volume.Forecast.Attainment >=1, 1, 0),
    Achieved.Profit.Forecast = 1,
    Objective.Attainment =
      ifelse(Objective == 1, Achieved.Volume.Forecast,
      ifelse(Objective == 2, Achieved.Profit.Forecast,NA)))
```

In an embodiment, other types of filtering by seasonality or by other effects may be used for gasoline fuel and other products or services may be used, depending on the effects to the particular product, service, market, etc.

Table 3A is a table listing predictors and cross accuracy error delta on a target volume and a volume forecast using a logistic regression. Table 3B is a table listing predictors and prediction accuracy on a target volume and a volume forecast using a logistic regression. Table 3C is a table listing predictors (where the predictors data are filtered by seasonality) and cross accuracy error delta on a target volume and a volume forecast using a logistic regression sorted by target top predictors. Table 3D is a table listing predictors (where the predictors data are filtered by seasonality) and prediction accuracy on a target volume and a volume forecast using a logistic regression sorted by target top predictors.

TABLE 3A

| | Predictor | Delta.Target | Delta.Forecast | Difference |
|---|---|---|---|---|
| 1 | Diff. Average | 0.242834769838432 | 0.246224050154146 | 0.003389280 |
| 2 | Diff. Lowest | 0.242571954124449 | 0.247521250385779 | 0.004949296 |
| 3 | Diff.Highest | 0.2452935670497 | 0.248821916739315 | 0.003528350 |
| 4 | Store.Price | 0.245778773377663 | 0.249750589016258 | 0.003971816 |
| 5 | Month | 0.244229641018617 | 0.24983257288037 | 0.005602932 |
| 6 | Day | 0.24483689268022 | 0.249843328194016 | 0.005006436 |
| 7 | AC.Move | 0.245666671948074 | 0.249848483487898 | 0.004181812 |
| 8 | RC.Move | 0.245260400433547 | 0.249871744047715 | 0.004611344 |
| 9 | Day.Percent | 0.240377767539655 | 0.249903626364791 | 0.009525859 |
| 10 | AC.Change | 0.245789253200509 | 0.249903684018071 | 0.004114431 |
| 11 | Season | 0.245503179756687 | 0.249904141124466 | 0.004400961 |
| 12 | Average | 0.245667204477307 | 0.249911976339141 | 0.004244772 |
| 13 | Lowest | 0.245605241303582 | 0.249916540082521 | 0.004311299 |
| 14 | Highest | 0.245691445077829 | 0.249925488520074 | 0.004234043 |
| 15 | Market.Move | 0.245780264120777 | 0.249931893976983 | 0.004151630 |
| 16 | RC.Change | 0.245787466652506 | 0.249933342316857 | 0.004145876 |
| 17 | Market.Change | 0.245796212219851 | 0.249939152933223 | 0.004142941 |
| 18 | Spread | 0.245677880285838 | 0.249941909714943 | 0.004264029 |
| 19 | Date | 0.245074563508816 | 0.249943061385972 | 0.004868498 |
| 20 | Year | 0.244685293623647 | 0.249943093092309 | 0.005257799 |
| 21 | Actual.Cost | 0.245355890733604 | 0.249945253096407 | 0.004589362 |
| 22 | Forecast.Day | 0.244447495598725 | 0.249947624544268 | 0.005500129 |
| 23 | Day.Avg | 0.244447074280626 | 0.249947834754221 | 0.005500760 |
| 24 | Replacement.Cost | 0.244520817925576 | 0.249948710318337 | 0.005427892 |
| 25 | Week | 0.245725147912018 | 0.24994965284312 | 0.004224505 |

TABLE 3B

| | Predictor | Prediction.Accuracy.Target | Prediction.Accuracy.Forecast | Difference |
|---|---|---|---|---|
| 1 | Diff.Average | 0.5696279 | 0.5514626 | −0.01816531 |
| 2 | Diff.Lowest | 0.5669228 | 0.5465681 | −0.02035470 |
| 3 | Diff.Highest | 0.5636688 | 0.5336437 | −0.03002504 |
| 4 | Store.Price | 0.5648489 | 0.5121864 | −0.05266247 |
| 5 | AC.Move | 0.5648489 | 0.5118669 | −0.04298202 |
| 6 | Day | 0.5648489 | 0.5100476 | −0.05480124 |
| 7 | Day.Percent | 0.5810542 | 0.5086840 | −0.07237016 |
| 8 | Month | 0.5706466 | 0.5080402 | −0.06260648 |
| 9 | Average | 0.5648489 | 0.5078677 | −0.05698114 |
| 10 | Lowest | 0.5648489 | 0.5077570 | −0.05709187 |
| 11 | RC.Change | 0.5648489 | 0.5077380 | −0.05711086 |
| 12 | Market.Change | 0.5648489 | 0.5076197 | −0.05722950 |
| 13 | Highest | 0.5648489 | 0.5074881 | −0.05736080 |
| 14 | Actual.Cost | 0.5645481 | 0.5073315 | −0.05748261 |
| 15 | Date | 0.5648489 | 0.5073315 | −0.05751741 |
| 16 | Day.Average | 0.5693684 | 0.5073315 | −0.06203699 |
| 17 | Forecast.Day | 0.5693684 | 0.5073315 | −0.06203699 |
| 18 | Market.Move | 0.5648489 | 0.5073315 | −0.05751741 |
| 19 | RC.Move | 0.5648489 | 0.5073315 | −0.05751741 |
| 20 | Replacement.Cost | 0.5648489 | 0.5073315 | −0.05751741 |
| 21 | Season | 0.5648489 | 0.5073315 | −0.05751741 |
| 22 | Spread | 0.5648489 | 0.5073315 | −0.05751741 |
| 23 | Week | 0.5648489 | 0.5073315 | −0.05751741 |
| 24 | Year | 0.5648489 | 0.5073315 | −0.05751741 |
| 25 | AC.Change | 0.5648489 | 0.5049918 | −0.05985709 |

TABLE C

| Predictor | Delta.Target | Delta.Forecast | Difference |
|---|---|---|---|
| 9 Day.Percent | 0.240377767539655 | 0.249903626364791 | 0.009525859 |
| 2 Diff.Lowest | 0.242571954124449 | 0.247521250385779 | 0.004949296 |
| 1 Diff. Average | 0.242834769838432 | 0.246224050154146 | 0.003389280 |
| 5 Month | 0.244229641018617 | 0.24983257288037 | 0.005602932 |
| 23 Day.Avg | 0.244447074280626 | 0.249947834754221 | 0.005500760 |
| 22 Forecast.Day | 0.244447495598725 | 0.249947624544268 | 0.005500129 |
| 24 Replacement.Cost | 0.244520817925576 | 0.249948710318337 | 0.005427892 |
| 20 Year | 0.244685293623647 | 0.249943093092309 | 0.005257799 |
| 6 Day | 0.24483689268022 | 0.249843328194016 | 0.005006436 |
| 19 Date | 0.245074563508816 | 0.249943061385972 | 0.004868498 |
| 8 RC.Move | 0.245260400433547 | 0.249871744047715 | 0.004611344 |
| 3 Diff. Highest | 0.2452935670497 | 0.248821916739315 | 0.003528350 |
| 21 Actual.Cost | 0.245355890733604 | 0.249945253096407 | 0.004589362 |
| 11 Season | 0.245503179756687 | 0.249904141124466 | 0.004400961 |
| 13 Lowest | 0.245605241303582 | 0.249916540082521 | 0.004311299 |
| 7 AC.Move | 0.245666671948074 | 0.249848483487898 | 0.004181812 |
| 12 Average | 0.245667204477307 | 0.249911976339141 | 0.004244772 |
| 18 Spread | 0.245677880285838 | 0.249941909714943 | 0.004264029 |
| 14 Highest | 0.245691445077829 | 0.249925488520074 | 0.004234043 |
| 25 Week | 0.245725147912018 | 0.24994965284312 | 0.004224505 |
| 4 Store.Price | 0.245778773377663 | 0.249750589016258 | 0.003971816 |
| 15 Market.Move | 0.245780264120777 | 0.249931893976983 | 0.004151630 |
| 16 RC.Change | 0.245787466652506 | 0.249933342316857 | 0.004145876 |
| 10 AC.Change | 0.245789253200509 | 0.249903684018071 | 0.004114431 |
| 17 Market.Change | 0.245796212219851 | 0.249939152933223 | 0.004142941 |

TABLE 3D

| Predictor | Prediction.Accuracy.Target | Prediction.Accuracy.Forecast | Difference |
|---|---|---|---|
| 7 Day.Percent | 0.5810542 | 0.5086840 | −0.07237016 |
| 8 Month | 0.5706466 | 0.5080402 | −0.06260648 |
| 1 Diff.Average | 0.5696279 | 0.5514626 | −0.01816531 |
| 16 Day.Average | 0.5693684 | 0.5073315 | −0.06203699 |
| 17 Forecast.Day | 0.5693684 | 0.5073315 | −0.06203699 |
| 2 Diff. Lowest | 0.5669228 | 0.5465681 | −0.02035470 |
| 4 Store.Price | 0.5648489 | 0.5121864 | −0.05266247 |
| 5 AC.Move | 0.5648489 | 0.5118669 | −0.04298202 |
| 6 Day | 0.5648489 | 0.5100476 | −0.05480124 |
| 9 Average | 0.5648489 | 0.5078677 | −0.05698114 |
| 10 Lowest | 0.5648489 | 0.5077570 | −0.05709187 |
| 11 RC.Change | 0.5648489 | 0.5077380 | −0.05711086 |
| 12 Market.Change | 0.5648489 | 0.5076197 | −0.05722950 |
| 13 Highest | 0.5648489 | 0.5074881 | −0.05736080 |
| 15 Date | 0.5648489 | 0.5073315 | −0.05751741 |
| 18 Market.Move | 0.5648489 | 0.5073315 | −0.05751741 |
| 19 RC.Move | 0.5648489 | 0.5073315 | −0.05751741 |
| 20 Replacement.Cost | 0.5648489 | 0.5073315 | −0.05751741 |
| 21 Season | 0.5648489 | 0.5073315 | −0.05751741 |
| 22 Spread | 0.5648489 | 0.5073315 | −0.05751741 |
| 23 Week | 0.5648489 | 0.5073315 | −0.05751741 |
| 24 Year | 0.5648489 | 0.5073315 | −0.05751741 |
| 25 AC.Change | 0.5648489 | 0.5049918 | −0.05985709 |
| 14 Actual.Cost | 0.5645481 | 0.5073315 | −0.05748261 |
| 3 Diff.Highest | 0.5636688 | 0.5336437 | −0.03002504 |

In an embodiment, correlation may be performed on the possible predictors and certain predictors or groups of predictors can be used for pre-filtering volume (and volume forecast) data (e.g., to be used for the predictions models (e.g., the reaction model 620, positioning model 630, and the volume forecast model 640). For example, in an embodiment, the difference average predictor may be used as the predictor for volume forecast, with a correlation (prediction accuracy) of 0.5514626. In another example, the combination of different average, actual cost movement, and market movement may be used as the predictors for volume forecast, with a combined correlation of 0.5530682. In yet another example, the combination of the difference average and the actual cost movement may be used as the predictors for the target volume, with a combined correlation of 0.5519182. In other embodiments, other predictors or predictors combinations may be selected and used, based on regression or other analysis of the predictors.

It is noted that while using more predictors may potentially increase the prediction accuracy (e.g., the predictors "fits" the data better at least when totality of the data are based on the predictors, and vice versa), using more predictors may "overfit" the data, leading to a certain loss in the predicative attribute. For example, using all of the predictors would lead to perfect predication accuracy, being that the data are based on exactly all of the predictors listed. However, certain predicative aspects of the combination of all predictors may be lost (in certain model) when, for example, certain request amount (e.g., target volume) is outside of the data (or does not exist as a data point).

Figure 8:
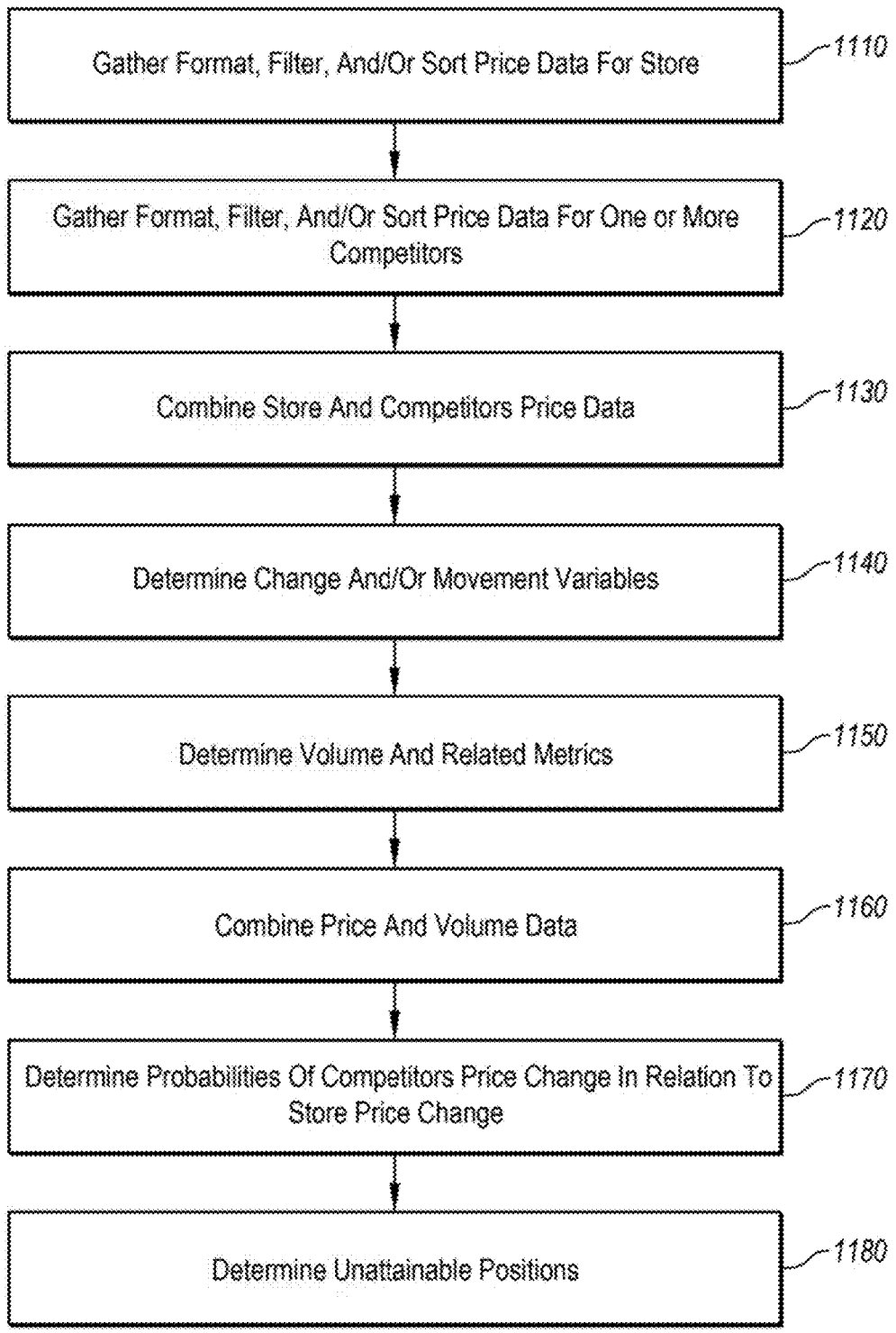
FIG. 8 illustrates a flow diagram of a reaction model process for a price optimization system according to an embodiment.

FIG. 8 illustrates a flow diagram of a reaction model process for a price optimization system according to an embodiment.

In a price optimization system, one may want to know what price one should price a certain product or service (e.g., $0.02 below competitor's average price), which would lead to what kind of competitor's reaction and/or or sales volume change. The reaction model process 1100 (e.g., for a reaction model 620) may be used to determine probabilities of a particular competitor's price change to a store price change (and the probability of at least a certain volume being sold (or the probability of the most likely volume amount sold)).

In an embodiment, the reaction model process 1100 may gather, format, filter, and/or sort price data for a store 1110 and gather, format, filter, and/or sort price data for one or more competitors 1120. For example, the price data may include one or more of date, time, and price information for the store and the competitors (which may be gathered from information sources 602A-602N or other sources).

In an embodiment, other data, such as data ranges for data, cost trend time range, market trend time range, stale price time range, stale competitor time range, unattainable position metrics, store by store objective, etc. may be gathered and/or used to filter the store price data and competitors price data. For example, the data ranges, cost trend time range, market trend time range, and stale price ranges may be used to further filter the price data to remove prices attributed to certain data, time, or price ranges. The unattainable position metrics and/or store by store objective may be used to set certain parameters for further processing (e.g., using the unattainable position metrics to determine unattainable positions 1180). In an embodiment, the other data may be set globally (e.g., for use by one or more of reaction model 620, positioning model 630, and volume forecast model 640) by the process 1100 or other processes.

The reaction model process 1100 may combine the store and competitors' price data 1130 and determine change and/or movement variables from the price data 1140. From the combined store and competitors' price data, change or movement data can be determined or extrapolated. For example, price changes (and/or difference in price from the previous price) at a certain time (and/or from a previous time) may be determined by comparing a price with a price at a previous time. In another example, competitors' price changes to the store's last price change (including lag time and direction of price change (up or down and same or different direction)) may be determined by comparing the competitors' price at a time to the store's price at a previous time closest for the time of the competitors' price. In an embodiment, the data and the movement data may be further grouped (e.g., groups of changes by every $0.05, groups of lag time (e.g., every 3 hours or by other time groups)).

In an embodiment, the change and/or movement variables may also be directly obtained from additional data gathered (e.g., from information sources 602A-602N).

For example, the price changes from store's data and the competitors' data may be combined using the following code:

```
COMPETITOR
##################################################################
# Format competitor prices
reaction_price_c <- price_c %>%
    filter(Date >= reaction_startdate & Date <= reaction_enddate) %>%
    select(Store, Competitor_ID, Distance, Product, Price_Timestamp,
        Price, Date) %>%
    arrange(Store, Date, Price_Timestamp)
Create a combined file
reaction <- rbind(reaction_price_s, reaction_price_c)
reaction <- reaction %>%
    arrange(Store, Date, Price_Timestamp) %>%
    group by(Store, Competitor_ID) %>%
    mutate(Change = round(Price - lag(Price), digits = 2)) %>%
    ungroup( ) %>%
    mutate(Move =
        ifelse(Change > 0 & Change <= .05, "up 1-5",
            ifelse(Change > .05, "up 6+",
                ifelse(Change < 0 & Change >= -.05, "down 1-5",
                    ifelse(Change < -.05, "down 6+",
                        ifelse(Change == 0, "same", NA)))))) %>%
    select(Store, Product, Date, Price_Timestamp,
        Price, Date, Move, Change, Competitor_ID) %>%
    mutate(Store Change Timestamp = as_datetime(ifelse(Competitor_ID == "Store",
                Price_Timestamp, NA)),
        Store Move = ifelse(Competitor_ID == "Store",
                Move, NA),
        Store Change = ifelse(Competitor_ID == "Store",
                Change, NA)) %>%
    arrange(Store, Price Timestamp) %>%
    group by(Store) %>%
    fill(Store Change_Timestamp, Store Move, Store Change) %>%
    ungroup( )
Calculate the time between store changes and competitor changes
reaction <- reaction %>%
    mutate(Lag = difftime(Price Timestamp, Store_Change_Timestamp,
            unit = "hours"))
Create change and movement categories for competitors
reaction <- reaction %>%
    mutate(Changed Price = ifelse(Change > 0, TRUE,
                ifelse(Change < 0, TRUE,
                    ifelse(Change == 0, FALSE, NA)))) %>%
    arrange(Store, Store Change Timestamp,
        desc(Changed Price)) %>%
```

```
group by(Store, Store_Change_Timestamp, Competitor ID) %>%
filter(row_number( )==1) %>%
ungroup( ) %>%
mutate(Same_Direction = Move == Store_Move,
    Reaction = Change/Store_Change)
```

The reaction model process 1100 may further determine volumes and other related metrics 1150. For example, volumes and other related metrics and/or data may include target volume sold, volume sold, sales, actual cost, replacement cost, replacement margin, rack cost, freight cost, other costs, tax, allowance, actual margin, replacement cost change, actual cost change, actual cost movement, replacement cost movement, day (of the week), hour (of the day), etc. . . . In an embodiment, some of these data may be determined and/or obtained using the following code:

```
VOLUME
##############################################-
##############################

reaction_volume<-volume %>%
    filter(Date>=reaction_startdate &
        Date<=reaction_enddate) %>%
    select(-Rack Cost, -Freight Cost,-Other Cost,-Tax,-Allowance)

Create cost metrics
reaction_volume<-reaction_volume %>%
    group_by(Store) %>%
    arrange(Store, Date) %>%
    mutate(Actual_Cost=ifelse(Actual_Cost==0, NA,
        Actual_Cost),
    RC_Trend=Replacement_Cost-lag(Replacement_
        Cost, n=setting cost trend),
    AC_Trend=Actual_Cost-lag(Actual_Cost,
        n=setting_cost_trend),
    AC_Move=ifelse(AC_Trend>setting_cost_upper,
        "Up",      ifelse(AC_Trend<setting_cost_lower,
        "Down", "Level")),
    RC_Move=ifelse(RC_Trend>setting_cost_upper,
        "Up",      ifelse(RC_Trend<setting_cost_lower,
        "Down", "Level"))) %>%
    ungroup( )
reaction_volume$Actual_Cost<-as.numeric(reaction_
    volume$Actual_Cost)
```

The reaction model process 1100 may combine price and volume data 1160. In an embodiment, the time of pricings may further be grouped by actual periods of the day (e.g., morning, afternoon, evening, etc. and/or rush hour, non-rush hour, etc.), which may be performed using the following code:

```
BASE TABLE
########################################################################
reaction base <- full_join(reaction, reaction_volume,
        by = c("Store", "Product", "Date"))
reaction base <- tbl_df(reaction base)
reaction base <- reaction_base %>%
    ungroup( ) %>%
    arrange(Store, Store_Change_Timestamp) %>%
    mutate(Actual_Margin = ifelse(Competitor ID =="Store", Price – Actual_Cost,NA),
        Replacement_ Margin =
            ifelse(Competitor_ID =="Store", Price - Replacement_Cost,NA),
        Store_Day = wday(Store_Change_Timestamp, label = TRUE),
        Store_Hour =hour(Store_Change_Timestamp),
        Store_Day Part = ifelse(Store_Hour >= 6 & Store_Hour < 10,
            "1_Morning-Rush",
            ifelse(Store_Hour >=10 & Store_Hour < 16,
                "2_Mid-Day",
                ifelse(Store_Hour >= 16 & Store_Hour < 20,
                    "3_Evening-Rush",
                    ifelse(Store_Hour >= 20 | Store_Hour < 6,
                        "4_Night", NA)))),
        Comp_Day = wday(Price_Timestamp, label = TRUE),
        Comp_Hour = hour(Price_Timestamp),
        Comp_Day_Part = ifelse(Comp_Hour >= 6 & Comp_Hour < 10,
            "1_Morning-Rush",
            ifelse(Comp_Hour >=10 & Comp_Hour < 16,
                "2 Mid-Day",
                ifelse(Comp_Hour >= 16 & Comp_Hour < 20,
                    "3 Evening-Rush",
                    ifelse(Comp_Hour >= 201 Comp Hour < 6,
                        "4 Night", NA))))) %>%
    ungroup( )
reaction_base$Actual Margin
reaction_base$Replacement_Margin <-
as.numeric(reaction_base$Replacement_Margin)
```

In an embodiment, the process 1110 may further analyze the combined data to review if certain data is considered bad, incomplete, or otherwise improper for the process. For example, such issues may include bad replacement cost, missing replacement cost movement, missing store price, or stale replacement cost. In an embodiment, the following code may be used to determine and filter such data:

```
Determines if replacement cost is bad
reaction_base <- reaction base %>%
  mutate(Bad_Replacement_Cost =
    ifelse((Price-Replacement_Cost)/Price >= setting_bad_replacement_cost |
        Replacement_Cost/Price >= 1.50,
      TRUE, FALSE),
    Missing_Replacement_Cost = is.na(Replacement_Cost),
    Missing_Store_Price = is.na(Price),
    Missing_RC_Move = is.na(RC_Move))
Missing Replacement Cost Movement (RC_Move)
data_missing_RC_Move <- reaction base %>%
  filter(Missing_RC_Move == TRUE) %>%
  select(Store, Date, RC_Move, Missing_RC_Move)
Missing Store Price
data_missing_store_price <- reaction base %>%
  filter(Missing_Store_Price == TRUE) %>%
  select(Store, Date, Price, Missing_Store_Price) %>%
  rename(Store_Price = Price)
Stale Replacement Cost
data_stale_replacement_cost <- reaction_base %>%
  select(Store, Date, Replacement_Cost) %>%
  arrange(Store, desc(Date)) %>%
  filter(!is.na(Replacement_Cost))%>%
  group_by(Store) %>%
  filter(row number( )==1) %>%
  mutate(Age_Stale Replacement_Cost = today-Date,
    Stale_Replacement_Cost =
    Age_Stale_Replacement_Cost >= setting stale replacement cost)%>%
  filter(Stale_Replacement_Cost== TRUE)
Bad Replacement Cost
data_bad_replacement_cost
  filter(Competitor_ID == "Store",
    Bad_Replacement_Cost==TRUE) %>%
  select(Store, Date, Replacement_Cost, Bad_Replacement_Cost)
Missing Replacement Cost
data_missing_replacement_cost <- reaction_base %>%
  filter(Competitor_ID == "Store",
    Missing_Replacement_Cost == TRUE) %>%
  select(Store, Date, Replacement_Cost, Missing_Replacement_Cost) %>%
  unique( )
reaction_base <- left_join(reaction_base, data_stale_replacement_cost,
    by=c("Store", "Date", "Replacement_Cost"))
reaction_base <- reaction base %>%
  mutate(Bad_Replacement_Cost = ifelse(is.na(Bad_Replacement_Cost),
      FALSE, Bad_Replacement_Cost),
    Missing_Replacement_Cost = ifelse(is.na(Missing_Replacement_Cost),
      FALSE, Missing_Replacement_Cost),
    Missing_Store_Price = ifelse(is.na(Missing_Store_Price),
      FALSE, Missing_Store_Price),
    Stale_Replacement_Cost = ifelse(is.na(Stale Replacement_Cost),
      FALSE, Stale_Replacement_Cost))
```

The reaction model process 1100 may determine probabilities of competitors' price change in relation to store price change 1170. For example, the combined store and competitors' price data (including change and/or movement variables) may be used to determine certain percentage and/or probabilities of the competitors' behavior when (if) the store does a price change. In an embodiment, the Bayesian probabilities may be calculated. In an embodiment, the probabilities may be determined and grouped using the following code:

```
Detail on the movement of competitor reactions
#######################
reaction.detail<-reaction.base %>%
  ungroup( )%>%
  filter(Competitor.ID !="Store", Store.Change !=0,
    Change !=0) %>%
  group_by(Store.Number, Competitor.ID, AC.Move,
    Store.Day, Store. Change) %>%
  mutate(Total.Count=n( ) %>%
  ungroup( )%>%
  group_by(Store.Number, Competitor.ID, AC.Move,
    Store.Day,
    Store. Change, Change) %>%
  mutate(Count=n( )
    Percentage=Count/Total.Count,
    Avg.Lag=round(mean(Lag), digits=0)) %>%
  select(Store.Number, Competitor.ID, AC.Move,
    Store.Day,
    Store. Change, Change, Total.Count, Count, Percentage, Avg.Lag) %>%
  mutate(Reaction.Variance=Change-Store.Change,
    Lag.Cat=ifelse(Competitor.ID=="Store", NA,
    ifelse(Avg.Lag<=3, "0-3 hrs",
    ifelse(Avg.Lag<=6, "3-6 hrs",
    ifelse(Avg.Lag<=12, "6-12 hrs",
    ifelse(Avg.Lag<=18, "12-18 hrs",
    ifelse(Avg.Lag<=24, "18-24 hrs",
    ifelse(Avg.Lag<=48, "24-48 hrs",
    ifelse(Avg.Lag<=72, "48-72 hrs", "72 hrs+"))))))))
    %>%
  arrange(Store.Number, Competitor.ID, AC.Move,
    Store.Day, Store. Change) %>%
  unique( )
```

In another embodiment, the following code may be used:

```
Table for the reaction UI
##################################################################
reaction <- reaction.base %>%
  ungroup( ) %>%
  filter(Store_Change != 0, Change != 0) %>%
  group_by(Store, Competitor_ID, RC_Move, Store_Change) %>%
  mutate(Total.Count = n( )) %>%
  ungroup( ) %>%
  group_by(Store, Competitor_ID, RC_Move,
       Store_ Change, Change) %>%
  mutate(Count = n( ),
    Percentage = Count/Total_Count,
    Avg_Lag = round(mean(Lag, na.rm=TRUE), digits=0)) %>%
  select(Store, Competitor_ID, Date, RC_Move,
       Store_Change, Change, Total_Count, Count, Percentage, Avg_Lag) %>%
  arrange(Store, desc(Competitor_ID), RC_Move, Store_Change) %>%
  unique( ) %+22%
  rename(Costs = RC_Move) %>%
  ungroup( )
reaction$Avg_Lag <- as.numeric(reaction$Avg_Lag)
reaction$Costs
reaction$Costs <- factor(reaction$Costs,
       levels=rev(levels(reaction$Costs)))
comp_info$Competitor_ID <- as.character(comp_info$Competitor ID)
reaction <- left_join(reaction, comp_info, by=c("Competitor ID"))
reaction$Name <- as.factor(reaction$Name)
reaction$Name <- factor(reaction$Name,
    levels=
       rev(levels(reaction$Name)))
# Table used to deal with the render reaction error when the change has not taken
place
reaction_changes <- reaction_base %>%
  ungroup( ) %>%
  select(Store, Store_Change)
```

The reaction model process 1100 determines unattainable positions 1180. In an embodiment, the probabilities determined in 1170 may include certain positions (or values) deemed unattainable. For example, when a store's price change does not elicit a reaction from the competitors (e.g., there is a zero probability that competitor change price due to store price change), the particular price change may be deemed an unattainable position or "no-go" price. In another example, certain guards may be put in place to deem a position unattainable (e.g., if the competitors' reaction to a store price change is too great to be acceptable as a realistic reaction). In an embodiment, the unattainable positions may be removed from the results (e.g., not to be presented to a user). In an embodiment, certain unattainable positions may be determined using the following code:

```
Table with no-go positions
nogo<-reaction.detail %>%
   filter(Reaction.Variance==reaction.variance,
   Percentage>=reaction.percentage,
   Avg.Lag<reaction.avg.lag,
   Count>reaction.count) %>%
arrange(Store.Number,   Competitor.ID,   AC.Move,
   Store.Day, Store. Change) %>%
unique( )
```

Figure 9A:
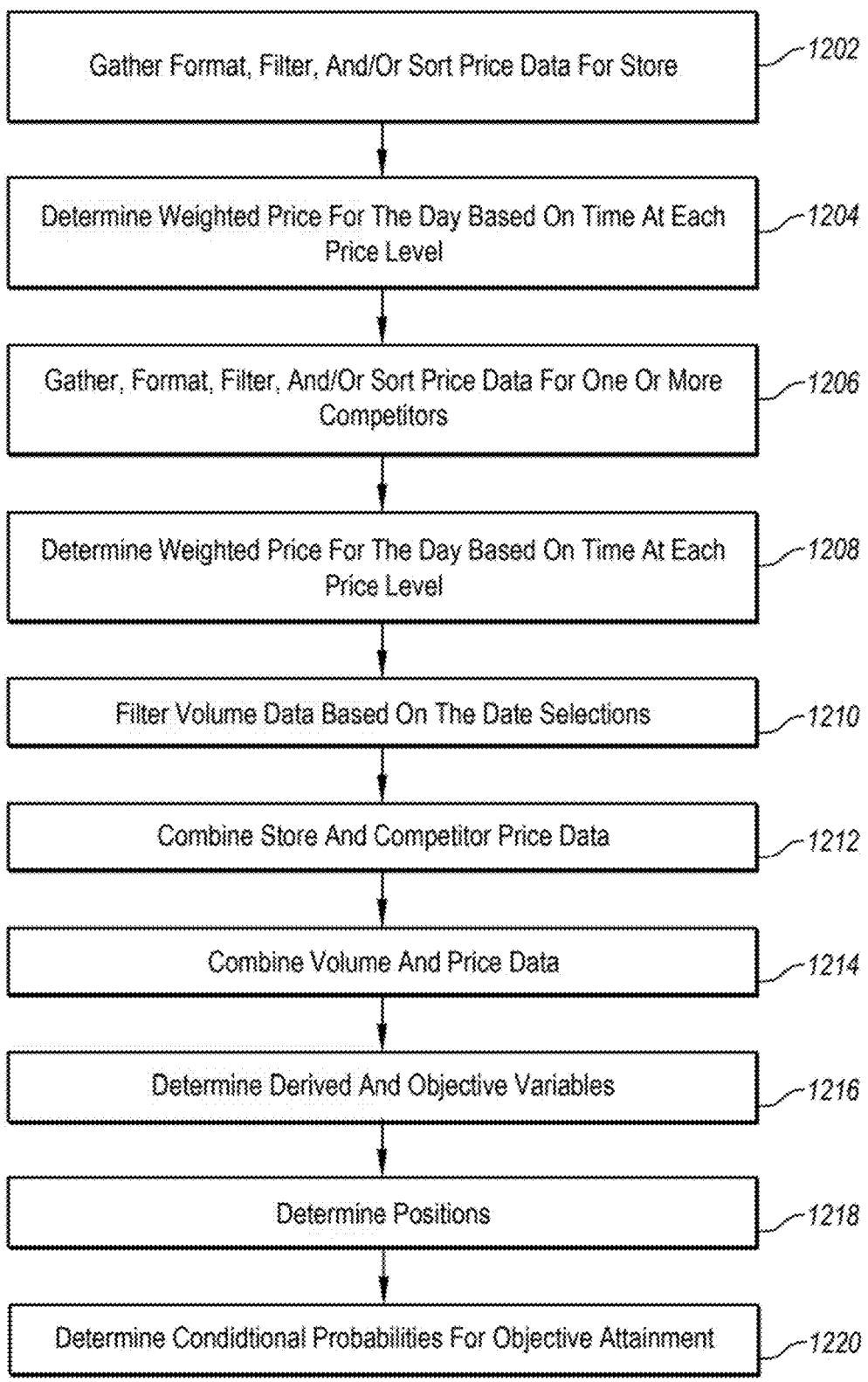
FIG. 9A illustrates a flow diagram of a positioning model process for a price optimization system according to an embodiment.

FIG. 9A illustrates a flow diagram of a positioning model process for a price optimization system according to an embodiment.

In a price optimization system, one may also want to know what price one should price a certain product or service while attaining a certain objective (e.g., a probability of selling a certain volume from a certain price change). The reaction model process 1200A (e.g., for a positioning model 630) may be used to determine probabilities of attaining a certain objective at different pricing positions (and the competitor's reaction).

In an embodiment, the positioning model process 1200A may gather, format, filter, and/or sort price data for a store 1202. For example, the price data may include one or more of date, time, and price information for the store (which may be gathered from information sources 602A-602N or other sources). In an embodiment, the price data for the store may be gathered by a reaction model process 1100 or other processes The positioning model process 1200A may determine the weighted price 1208 for the day based on the time at each price level for the store 1204. For example, if the price is $2.20 for the first 12 hours of a day and $2.40 for the next 12 hours of a day, the weighted price for the day may be $2.30. In an embodiment, the weighted price may be determined using the following code:

```
Calculate the weighted price for the day.
position.price.s <- group_by(position.price.s, Store.Number)
position.price.s <- position.price.s %>%
   mutate(Weighted.Price = as.numeric(
     # First record, with or without a price change
     ifelse(is.na(lag(Date)) & Date - lead(Date) < 0, Price,
     # First record, first of multiple price changes
     ifelse(is.na(lag(Date)) & Date - lead(Date) == 0,
     (Price * (difftime(lead(Price.Timestamp),
```

```
            Date, unit = "hours")) / 24),
          # Last record, no price change
          ifelse(Date - lag(Date) > 0 & is.na(lead(Date)),
          Price,
          # Last record, multiple price changes
          ifelse(Date - lag(Date) == 0 & is.na(lead(Date)),
          Price * difftime(Date + 60*60*24, Price.Timestamp, unit = "hours") / 24,
          # Last record, one price change
          ifelse(Date - lag(Date) > 0 & is.na(lead(Date)),
          lag(Price) * (difftime(Price.Timestamp, Date, unit = "hours")) / 24 +
          Price * (difftime(Date + 60*60*24,
          Price.Timestamp, unit = "hours")) / 24,
          # No price change in the day
          ifelse((Date - lag(Date) > 0 & is.na(Price.Timestamp)),
          Price,
          # One price change during the day
          ifelse(((Date - lag(Date) > 0) & (Date - lead(Date) < 0)),
          lag(Price) * (difftime(Price.Timestamp, Date, unit = "hours")) / 24 +
          Price * (difftime(Date + 60*60*24,
          Price.Timestamp, unit = "hours")) / 24,
          # Multiple price changes in a day - First price change in the day
          ifelse(((Date - lag(Date) > 0) & (Date - lead(Date) == 0)),
          lag(Price) * (difftime(Price.Timestamp, Date, unit = "hours")) / 24 +
          (Price * (difftime(lead(Price.Timestamp),
          Price.Timestamp, unit = "hours")) / 24),
          # Multiple - Middle price changes in the day
          ifelse(((Date - lag(Date) == 0) & (Date - lead(Date) == 0)),
          Price * (difftime(lead(Price.Timestamp), Price.Timestamp,
            unit = "hours")) / 24,
          # Multiple - Last price change in the day
          ifelse(((Date == lag(Date)) & (Date < lead(Date))),
              Price * difftime(Date + 60*60*24, Price.Timestamp, unit = "hours ") / 24,
              "issue"))))))))))))
position.price.s$Weighted.Price <- as.numeric(position.price.s$Weighted.Price)
position.price.s <- group_by(position.price.s, Store.Number, Product, Date)
position.price.s.weighted <- tbl_df(summarise(position.price.s,
        Weighted.Price = sum(Weighted.Price)))
```

The positioning model process 1200A may gather, format, filter, and/or sort price data for one or more competitors 1206. For example, the price data may include one or more of date, time, and price information for the competitors (which may be gathered from information sources 602A-602N or other sources). In an embodiment, the price data for the store may be gathered by a reaction model process 1100 or other processes.

In an embodiment, the competitor price data may be further processed to include records for times (days) when there is store price data. Further, stale prices (for either the store or the competitors) may also be removed. For example, stale prices may include prices that are deemed to be incorrect or at least questionable data. In an embodiment, stale prices may be removed or flagged for verification if determined to be outside of certain ranges, or by other verification processes.

The weighted price for the competitors may be determined similar to the determination of the weighted price for the store 1204.

In an embodiment, the competitors' price data may be further processed to rank and select a certain number (e.g., 3) of the closest (e.g., geographically) competitors. Further, competitor benchmarks may be created (e.g., lowest, average, and highest benchmarks).

The positioning model process 1200A may filter volume data based on the date selections 1210 (e.g., the date of the pricing data).

The positioning model process 1200A may combine store and competitors price data 1212. In an embodiment, the differentials between the store price and the benchmarks may be determined.

The positioning model process 1200A may combine the volume and price data 1214. In an embodiment, other data may also be combined, including costs data and store settings.

The positioning model process 1200A may determine derived and objective variables 1216. The derived variables may include last year volumes, cost movement, profit, and market movement. For example, determining the profit data may include determining the average profit based on the day of the week and/or season, which may be used as a benchmark for profit objectives. The objective variables may include volume attainment based on actual volumes and/or volume targets or profit attainment based on benchmark (that may be to be determined).

In an embodiment, the determination of the derived and other variables may be performed using the following code:

```
Add derived variables
position. base <- position. base %>%
   ungroup( ) %>%
   # Handle missing data (except Replacement Cost which is not used in current
analysis)
   mutate(Actual.Margin = Sales/Volume − Actual.Cost,
     Market.Margin = Average − Actual.Cost) %>%
```

```
filter(Volume.Target != 0, !is.na(Volume.Target),
   Volume != 0, !is.na(Volume),
   Actual.Cost != 0, !is.na(Actual.Cost),
   !is.na(Actual.Margin)) %>%
# Differentials
mutate(Diff.1 = Store.Price - '1',
   Diff.2 = Store.Price - '2',
   Diff.3 = Store.Price - '3',
   Diff.Lowest = Store.Price - Lowest,
   Diff.Average = Store.Price - Average,
   Diff.Highest = Store.Price - Highest) %>%
# Date variables
mutate(Day = wday(Date, label = TRUE),
   Week = week(Date),
   Month = month(Date, label = TRUE),
   Season = ifelse(Month %in% c("Dec", "Jan", "Feb"), "Winter",
      ifelse(Month %in% c("Mar", "Apr", "May"), "Spring",
         ifelse(Month %in% c("Jun", "Jul", "Aug"), "Summer",
            ifelse(Month %in% c("Sep", "Oct", "Nov"),
               "Fall", NA)))),
   Year = year(Date)) %>%
# Cost, market, and volume variables
group_by(Store.Number) %>%
mutate(Last.Year = lag(Volume, n = 364),
   RC.Change = Replacement.Cost - lag(Replacement.Cost, n = cost.trend),
   RC.Move = ifelse(RC.Change > cost.move.upper, "up",
      ifelse(RC.Change < cost.move.lower, "down", "level")),
   AC.Change = Actual.Cost - lag(Actual.Cost, n = cost.trend),
   AC. Move = ifelse(AC.Change > cost.move.upper, "up",
      ifelse(AC.Change < cost.move.lower, "down", "level")),
   Market.Change = round(Average - lag(Average, n=7),digits=2),
   Market.Move = ifelse(Average - lag(Average, market.trend) >
      market.move.upper, "up",
      ifelse(Average - lag(Average, market.trend) <
         market.move.lower, "down", "level")),
   Profit = Sales - (Volume * Actual.Cost)) %>%
group_by(Store.Number, Year, Month, Day) %>%
mutate(Profit.Target = mean(Profit)) %>%
# group by(Store.Number) %>%
# mutate("4wk.Profit"= )
ungroup( ) %>%
# Objectivie variables
mutate(Volume.Target.Attainment = Volume/Volume.Target,
   Profit.Target.Attainment = Profit/Profit.Target,
   Achieved.Volume.Target = as.factor(
      ifelse(Volume.Target.Attainment < 1, 0, 1)),
   Achieved.Profit.Target = as.factor(
      ifelse(Profit.Target.Attainment < 1, 0, 1)),
   Performance.LY = ifelse(Volume >= Last.Year, 1, 0))
```

The positioning model process 1200A may determine positions 1218, which may include determining positioning (e.g., by cents) for competitor benchmarks (e.g., the 3 closest competitors and the lowest, average, and highest benchmarks). For example, the positioning may start with the average differential for each cost movement groups (e.g., by every 10 cents). In an embodiment, the position determination may be performed using the following code:

```
Calculate Positions
Adding positioning by cents for all 6 competitor benchmarks. Starting point-
is the average differential for each cost movement group, +/- 10 cents
position. base <- ungroup(position.base)
position. base <- group by(position.base, Store.Number, AC. Move, Market.Move)
position. base <- mutate(position.base,
         Diff.A.Mean = round(mean(Diff.Average, na.rm = TRUE),
            digits=2),
         Diff.A.With.Mean = Diff.Average - Diff.A.Mean)
position.base <- ungroup(position.base)
Create a means table to be used in later calculations
means <- unique(select(position.base, Store.Number,
         AC.Move, Market.Move, Diff.A.Mean))
position.base <- mutate(position.base,
   Relative.Position =
      ifelse(Diff.A.With.Mean <= -.095, "Competitor.Average_-.10",
      ifelse(Diff.A.With.Mean <= -.085, "Competitor.Average_-.09",
      ifelse(Diff.A.With.Mean <= -.075, "Competitor.Average_-.08",
      ifelse(Diff.A.With.Mean <= -.065, "Competitor.Average_-.07",
      ifelse(Diff.A.With.Mean <= -.055, "Competitor.Average_-.06",
      ifelse(Diff.A.With.Mean <= -.045, "Competitor.Average_-.05",
```

```
    ifelse(Diff.A.With.Mean <= −.035, "Competitor.Average_−.04",
    ifelse(Diff.A.With.Mean <= −.025, "Competitor.Average_−.039",
    ifelse(Diff.A.With.Mean <= −.015, "Competitor.Average_−.02",
    ifelse(Diff.A.With.Mean <= −.005, "Competitor.Average_−.01",
    ifelse(Diff.A.With.Mean <= .004, "Competitor.Average_0",
    ifelse(Diff.A.With.Mean <= .014, "Competitor.Average_.01",
    ifelse(Diff.A.With.Mean <= .024, "Competitor.Average_.02",
    ifelse(Diff.A.With.Mean <= .034, "Competitor.Average_.03",
    ifelse(Diff.A.With.Mean <= .044, "Competitor.Average_.04",
    ifelse(Diff.A.With.Mean <= .054, "Competitor.Average_.05",
    ifelse(Diff.A.With.Mean <= .064, "Competitor.Average_.06",
    ifelse(Diff.A.With.Mean <= .074, "Competitor.Average_.07",
    ifelse(Diff.A.With.Mean <= .084, "Competitor.Average_.08",
    ifelse(Diff.A.With.Mean <= .094, "Competitor.Average_.09",
    ifelse(Diff.A.With.Mean > .094, "Competitor.Average_.10", NA
    ))))))))))))))))))))
```

The positioning model process 1200A may determine the conditional probabilities for attaining the objective 1220. The conditional probabilities may be based on the combined data (e.g., using Naïve Bayes probability determination). In an embodiment, a Laplace smoothing factor may be set for the conditional probability determination in order to smooth out the extremes.

In an embodiment, the prior probability of attaining an objective may be determined using the combined data using the following code:

```
Prior probability of objective attainment
naive_bayes_prior<-position_base %>%
    ungroup( ) %>%
    filter(!is.na(Objective_Attainment)) %>%
    select(Store, Objective_Attainment) %>%
    group_by(Store) %>%
    mutate(Total_Prior=n( ) %>%
    group_by(Store, Objective_Attainment) %>%
    mutate(Count_Prior=n( ),
        Prob_Prior=Count_Prior/Total_Prior) %>%
    unique( ) %>%
    select(Store, Objective_Attainment, Prob_Prior)
```

The cost factors may be determined using the following code:

```
Cost Factors
naive_bayes_cost<-position_base %>%
    ungroup( ) %>%
    filter(!is.na(Objective_Attainment), !is.na(RC_Move),
        Bad_RC_Move==FALSE) %>%
    select(Store, Objective_Attainment, RC_Move) %>%
    group_by(Store, Objective_Attainment) %>%
    mutate(Total=n( ) %>%
    group_by(Store, Objective_Attainment, RC_Move)
        %>%
    mutate(Count=n( ),
        Prob=Count/Total) %>%
    unique( ) %>%
    group_by(Store, Objective_Attainment) %>%
    mutate(laplace=n( ),
        Smooth_AC=(Count+k)/(Total+(k*laplace))) %>%
    select(Store, Objective_Attainment, RC_Move,
        Smooth_AC)
# Laplace Smoothing. "laplace" is the count of positions
    (up, down, level)
```

The market factors may be determined using the following code:

```
Market Factors
naive_bayes_market<-position_base %>%
    ungroup( )%>%
    filter(!is.na(Objective_Attainment), !is.na(Market_
        Move)) %>%
    select(Store, Objective_Attainment, Market_Move)
        %>%
    group_by(Store, Objective_Attainment) %>%
    mutate(Total=n( ) %>%
    group_by(Store, Objective_Attainment, Market_
        Move) %>%
    mutate(Count=n( ),
        Prob=Count/Total) %>%
    unique( ) %>%
    group_by(Store, Objective_Attainment) %>%
    mutate(laplace=n( ),
        Smooth_M=(Count+k)/(Total+(k*laplace))) %>%
    select(Store, Objective_Attainment, Market_Move,
        Smooth_M)
# Laplace Smoothing. "laplace" is the count of positions
    (down, level, up)
```

The position factors (e.g., competitor average factors) may be determined using the following code:

```
Position Factors
naive_bayes_position<-position_base %>%
    ungroup( ) %>%
    filter(!is.na(Objective_Attainment), !is.na(Position))
        %>%
    select(Store, Objective_Attainment, Position) %>%
    group_by(Store, Objective_Attainment) %>%
    mutate(Total=n( ) %>%
    group_by(Store, Objective_Attainment, Position)
        %>%
    mutate(Count=n( ),
        Prob=Count/Total) %>%
    unique( ) %>%
    group_by(Store, Objective_Attainment) %>%
    mutate(laplace=n( ),
        Smooth_A=(Count+k)/(Total+(k*laplace))) %>%
    group_by(Store, Position) %>%
    mutate(Position_Count=sum(Count)) %>%
    select(Store, Objective_Attainment, Position,
        Smooth_A, Position Count)
# Laplace Smoothing. "laplace" is the count of positions
# (match, +0.10, −0.10)
Prior probability of objective attainment
```

The predictions and posterior probabilities may be determined using the following code:

```
PREDICTIONS AND POSTERIOR PROBABILITY CALCULATIONS
###########################################################

# Create table with Cost and Market probabilities
naive_bayes <- inner_join(naive_bayes_prior, naive_bayes_cost,
       by = c("Store", "Objective_Attainment"))
naive_bayes <- inner_join(naive_bayes, naive_bayes_market,
       by = c("Store", "Objective_Attainment"))
Add Position
naive_bayes <- inner_join(naive_bayes, naive_bayes_position,
       by = c("Store", "Objective_Attainment"))
naive bayes <- naive bayes %>%
   mutate(Score_A = Prob_Prior*Smooth_AC*Smooth_M*Smooth_A) %>%
   group by(Store, RC Move, Market Move, Position) %>%
   mutate(Attainment_Count = n( ),
      Achieve = ifelse(max(Score_A) == Score _A & Objective_Attainment == 1,
TRUE,
        ifelse(min(Score_A) == Score_A & Objective_Attainment == 0 &
           Attainment_Count == 2, TRUE, FALSE)),
      Joint_ Prob = sum(Score_A),
      Probability =Score_A/Joint_Prob) %>%
arrange(Store, RC_Move, Market_Move, desc(Probability), desc(Position)) %>%
select(Store, Objective_Attainment, RC_Move, Market_Move,
      Position, Position_Count, Probability) %>%
   filter(Objective_Attainment == 1)
frequency <- naive bayes %>%
   ungroup( ) %>%
   select(Store, Position, Position_Count) %>%
   unique( ) %>%
   group_by(Store) %>%
   mutate(Frequency = Position_Count/sum(Position_Count))
naive_bayes <- left_join(naive_bayes, frequency,
       by=c("Store", "Position", "Position_Count"))
```

Figure 9B:
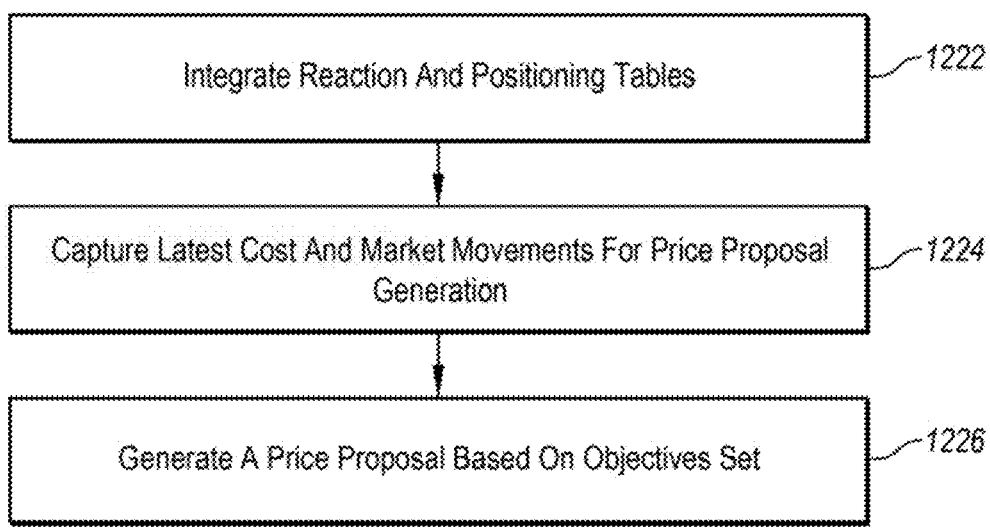
FIG. 9B illustrates a flow diagram of a continued positioning model process for a price optimization system according to an embodiment.

FIG. 9B illustrates a flow diagram of a continued positioning model process for a price optimization system according to an embodiment.

The process 1200B may integrate the reaction model tables (e.g., from the reaction model process 1100) and the positioning model tables 1222. In an embodiment, the unattainable positions are removed from the integrated tables.

The process 1200B may further capture the latest cost and market movements for a price proposal generation 1224, which may be performed using the following code:

```
Capture the latest cost and market movements
cost.move <- reaction.base %>%
   select(Store.Number, Date, Actual. Cost, AC.Change, AC.Move, Actual.Margin,
        Replacement.Cost, RC.Change, RC.Move, Replacement.Margin) %>%
   group_by(Store.Number) %>%
   arrange(Store.Number, desc(Date)) %>%
   na.omit( ) %>%
   filter(row number( )==1) %>%
   rename(Latest.AC.Move = AC.Move)
market.move <- position.base %>%
   select(Store.Number, Date, Market.Change, Market.Move) %>%
   group_by(Store.Number) %>%
   arrange(Store.Number, desc(Date)) %>%
   na.omit( ) %>%
   filter(row_number( )==1)
cost.market.move <- merge(cost.move, market.move, by = "Store.Number")
cost.market.move <- rename(cost.market.move,
           Date. Cost = Date.x,
           Date.Market = Date.y,
           AC.Move = Latest.AC.Move)
cost.market.move <- merge(cost.market.move, store. settings,
         by = "Store.Number", all.x=TRUE)
Adding most current cost movement data and setting the Store.Day variable to the
current day's value.
latest.benchmarks <- merge(combined, cost.move, by = "Store.Number")
latest.benchmarks <- latest.benchmarks %>%
   select(Store.Number, Product, Competitor. ID, Benchmark,
        Latest.AC.Move, Store.Day, Price.Timestamp, Price) %>%
   rename(AC.Move = Latest.AC.Move) %>%
   mutate(Store.Day = wday(today( ), label = TRUE)) %>%
   arrange(Store.Number, Benchmark)
nogo <- mutate(nogo, Unattainable.Position = TRUE)
reaction.position <- merge(latest.benchmarks, nogo,
```

```
            by = c("Store.Number", "Competitor.ID",
                "AC.Move", "Store.Day"),
            all.x = TRUE)
reaction. position <- reaction.position %>%
    mutate(Benchmark =
        ifelse(Benchmark == 1, "Competitor.1",
        ifelse(Benchmark == 2, "Competitor. 2",
        ifelse(Benchmark == 3, "Competitor. 3",
        ifelse(Benchmark == "Lowest", "Competitor.Lowest",
        ifelse(Benchmark == "Average", "Competitor. Average",
        ifelse(Benchmark == "Highest", "Competitor.Highest",
        ifelse(Benchmark == "Store", "Store", NA)))))))) %>%
    arrange(Store.Number, Benchmark)
```

In an embodiment, the following code may be used for using the latest data and the latest market data before or after the determining of the condition probabilities 1220:

```
LATEST DATA
########################################################################

########################################################################
###############
Latest Costs
latest_cost <- reaction_base %>%
    select(Store, Date, Replacement_Cost, RC_Trend, RC_Move,
        Replacement_Margin, Bad_Replacement_Cost, Stale_Replacement_Cost) %>%
    filter(!is.na(Replacement_Cost)) %>%
    group_by(Store) % >%
    arrange(Store, desc(Date), desc(Replacement_Cost), desc(Replacement_Margin))
%>%
    filter(row_number( )==1,
        Bad_Replacement_Cost == FALSE,
        Stale_Replacement_Cost == FALSE) %>%
    rename(Cost_Date = Date) %>%
    select(-Bad_Replacement_Cost, -Stale_Replacement_Cost)
Latest Store Prices
store <- price_s %>%
    group_by(Store) %>%
    arrange(Store, desc(Price_Timestamp)) %>%
    filter(row_number( )==1) %>%
    mutate(Store_Day = wday(today, label=TRUE)) %>%
    select(Store, Date, Price_Timestamp, Store_Day, Price) %>%
    rename(Store_Date = Date,
        Store_Price_Timestamp = Price_Timestamp,
        Store_Price = Price)
Latest Market - use position base to capture Market_Trend and Market_Move
market <- position_base %>%
    select(Store, Date, Rounded_Market_Average, Market_Trend, Market_Move) %>%
    group_by(Store) %>%
    arrange(Store, desc(Date)) %>%
    filter(!is.na(Rounded_Market_Average), row_number( )==1) %>%
    rename(Market_Date = Date) %>%
    select(-Rounded_Market_Average) %>%
    ungroup( )
latest_market_price <- price_c %>%
    group_by(Store, Competitor_ID) %>%
    arrange(Store, Competitor_ID, desc(Price_Timestamp)) %>%
    filter(row_number( )==1) %>%
    mutate(Date = as_date(today),
        Age_Competitor_Price = as_date(Date) - as_date(Price_Timestamp),
        Stale_Competitor_Price = Age_Competitor_Price >= setting_stale_price,
        Age_Competitor = today - as_date(max(Price_Timestamp, na.rm = TRUE)),
        Stale_Competitor = Age_Competitor >= setting_stale_comp) %>%
    filter(Stale_Competitor_Price==FALSE,
        Stale_Competitor==FALSE) %>%
    group_by(Store) %>%
    mutate(Rounded_Market_Average = round(mean(Price, na.rm=TRUE),digits=2)-
0.001) %>%
    arrange(Store, desc(Price_Timestamp)) %>%
    select(Store, Rounded_Market_Average, Price_Timestamp) %>%
    rename(Market_Price_Timestamp = Price_Timestamp) %>%
    filter(row_number( )==1)
market <- full_join(market, latest_market_price,
        by=c("Store"))
latest_metrics <- position_base %>%
```

```
  select(Store, Date, Volume_Attainment_Mean, Profit_Baseline,
    Run_Rate_Week, Volume_Baseline, Volume_Target, Objective,
Sub_Objective) %>%
  group_by(Store) %>%
  arrange(Store, desc(Date)) %>%
  filter(row_number( )==1) %>%
  rename(Metrics_Date = Date)
data_issues <- issues %>%
  select(-Replacement_Cost, -Volume, -Replacement_Cost_Movement, -
Market_Movement, -Competitor_ID,
    -Competitor_Price_Timestamp, -Competitor_Price, -Age_of_Competitor_Price,
    -Volume_Mean, -Missing_Replacement_Cost_Movement,
    -Missing_Replacement_Cost, -Missing_Volume, -Replacement_Cost_Trend)
latest <- full_join(store, market, by=c("Store"))
latest <- full_join(latest, latest_cost, by=c("Store"))
latest <- full_join(latest, latest_metrics, by=c("Store"))
latest <- latest %>%
  mutate(Date=as_date(today))
latest <- left_join(latest, data_issues, by=c("Store", "Date"))
latest <- latest %>%
  mutate(Data_Issue =
    ifelse(Bad_Replacement_Cost==TRUE |
      Bad_Volume==TRUE |
      Stale_Replacement_Cost==TRUE |
      Missing_Market_Movement==TRUE |
      Short_on_Records_needed_to_Model==TRUE |
      Stale_Competitor_Price==TRUE |
      Bad_Replacement_Cost_Movement==TRUE, TRUE, FALSE)) %>%
unique( )
```

The process 1200B may generate a price proposal based on the objectives set 1226, which may be performed using the following code:

```
Calculate the position of moves that are followed
reaction.position <- reaction.position %>%
  group_by(Store.Number) %>%
  mutate(Store.Price = ifelse(Benchmark == "Store", Price, NA)) %>%
  arrange(Store.Number, desc(Store.Price)) %>%
  fill(Store.Price) %>%
  mutate(New.Store.Price = Store.Price + Store.Change,
    Un.Position = round(New.Store.Price - Price, digits=2))
reaction.position
  group_by(Store.Number) %>%
  mutate(Competitor.Average =
    ifelse(Benchmark=="Competitor.Average", Price, NA)) %>%
  arrange(Store.Number, desc(Competitor.Average)) %>%
  fill(Competitor.Average) %>%
  arrange(Store.Number, Benchmark) %>%
  mutate(Un.Position.Avg =
    round(New.Store.Price - Competitor.Average, digits=2))
average <- reaction.position
average <- mutate(average,
    Competitor.ID = "Average",
    Benchmark = "Competitor.Average",
    Un.Position = Un.Position.Avg)
reaction.position <- rbind(reaction.position, average)
reaction. position <- arrange(reaction.position, Store.Number)
unattainable.position <- select(reaction.position,
    Store.Number, Competitor.ID, AC.Move, Store.Day,
    Product, Benchmark, Price.Timestamp,
    Un.Position, Unattainable.Position)
unattainable.position <- rename(unattainable.position,
    Position = Un.Position)
Caclulate the difference with the current benchmark position for the highest-
probability poistion to achieve the objective.
position.prob <- naive.bayes
position. prob <- merge(position.prob, means,
    by = c("Store.Number", "AC.Move",
      "Market.Move"),
    all.x = TRUE)
position. prob <- mutate(position.prob,
  Position =
    ifelse(Benchmark == "Competitor.Average", Diff.A.Mean + Difference.Mean,
    NA))
position. prob <- select(position.prob, Store.Number, Objective. Attainment,
```

```
AC.Move,
      Market.Move, Benchmark, Difference.Mean, Count,
      Position.Count, Probability, Position)
Merging the unattainable positions with the probability table
blocked <- merge(position.prob, unattainable, position,
      by = c("Store.Number", "AC.Move", "Benchmark", "Position"),
      all.x = TRUE)
blocked <- blocked %>%
   select(Store.Number, Objective.Attainment, AC.Move, Market.Move,
      Benchmark, Difference.Mean, Count, Position.Count, Probability,
Unattainable.Position) %>%
   mutate(Probability =
      ifelse(is.na(Unattainable.Position), Probability, 0)) %>%
   select(Store.Number, AC.Move, Market.Move,
      Benchmark, Difference.Mean, Count, Position.Count, Probability)
naive.bayes <- blocked
####################################################################
##########
####################################################################
##########
naive.bayes <- merge(naive.bayes, means, by = c("Store.Number", "AC.Move",
         "Market.Move"))
Calculate the difference with the current benchmark position for the highest-
probability position to achieve the objective.
naive.bayes <- mutate(naive.bayes,
      Position =
         ifelse(Benchmark == "Competitor.Average", Diff.A.Mean + Difference.Mean,
         NA))
naive.bayes <- select(naive.bayes, Store.Number, AC.Move, Market.Move,
Benchmark,
         Difference.Mean, Count, Position.Count, Probability, Position)
Calculate the proposed price based on the benchmark differential
####################################################################
last.price <- latest.benchmarks %>%
   mutate(Benchmark =
      ifelse(Benchmark == 1, "Competitor.1",
      ifelse(Benchmark == 2, "Competitor.2",
      ifelse(Benchmark == 3, "Competitor.3",
      ifelse(Benchmark == "Lowest", "Competitor.Lowest",
      ifelse(Benchmark == "Average", "Competitor.Average",
      ifelse(Benchmark == "Highest", "Competitor.Highest",
      ifelse(Benchmark == "Store", "Store", NA)))))))) %>%
mutate(Store.Price =
      ifelse(Benchmark == "Store", Price, NA)) %>%
arrange(Store.Number, desc(Store.Price)) %>%
group_by(Store.Number) %>%
fill(Store.Price)
bayes.price <- merge(naive.bayes, last.price,
         by = c("Store.Number", "Benchmark", "AC.Move"))
Rounding the ideal position
bayes.price <- mutate(bayes.price,
         Price.Proposal = (round(Price, digits=2) - .001) + Position,
         Price.Change = round(Price.Proposal - Store.Price, digits=2),
         Probability = round(Probability, digits=3))
Selecting the proposed price based on current cost and market conditions
price.proposal <- merge(bayes.price, cost.market.move,
         by = c("Store.Number", "AC.Move", "Market.Move"))
price.proposal
         Benchmark.Price = Price,
         Benchmark.Timestamp = Price.Timestamp,
         Current.Store.Price = Store.Price)
price.proposal <- price.proposal %>%
   select(Store.Number, Date.Cost, Date.Market, Actual.Cost, AC.Change, AC.Move,
      Actual.Margin, Replacement.Cost, RC.Change, RC.Move,
Replacement.Margin,
      Market.Change, Market.Move, Benchmark,
      Competitor.ID, Difference.Mean, Position,
      Benchmark.Price, Benchmark.imestamp, Current.Store.Price,
      Price.Proposal, Price.Change, Count, Position.Count, Probability,
      Objective, Sub.Objective, Competitor.Benchmark, Plus.Minus) %>%
arrange(Store.Number, desc(Probability))
Filtering benchmarks with stale prices
price.proposal <- filter(price.proposal, today - as_date(Benchmark.Timestamp) <= 2)
Modify the proposal table for the probability plot
price.proposal <- price.proposal %>%
   group_by(Store.Number) %>%
   mutate(Replacement.Margin =
         round(Price.Proposal - Replacement.Cost, digits = 3),
      Frequency = Count/sum(Count),
```

```
            Mix1 = ifelse(Probability >= threshold,
                 Replacement.Margin * Probability,0),
            Mix2 = ifelse(Probability >= threshold,
                 Replacement.Margin * Probability * Frequency, 0),
            Mix3 = ifelse(Probability >= threshold,
                 Probability * Frequency, 0),
          Proposal.Margin = ifelse(Probability >=threshold,
                 Replacement.Margin, 0),
          Proposal.Prob =
              ifelse(Sub.Objective == 1 &
                Probability >= threshold &
                Probability==max(Probability), Probability,
              ifelse(Sub.Objective ==2 &
                Probability >= threshold &
                Proposal.Margin==max(Proposal.Margin), Probability,
              ifelse(Sub.Objective == 3 &
           Mix1==max(Mix1), Probability,
         ifelse(Sub.Objective ==4 &
           Mix2 ==max(Mix2), Probability,
         ifelse(Sub.Objective == 5 &
           Mix3==max(Mix3), Probability,0))))),
       Proposal.Frequency =
         ifelse(Sub.Objective == 1 &
           Probability >=+0t hreshold &
           Probability==max(Probability), Frequency,
         ifelse(Sub.Objective == 2 &
           Probability >= threshold &
           Proposal.Margin==max(Proposal.Margin), Frequency,
         ifelse(Sub.Objective== 3 &
           Mix1==max(Mix1), Frequency,
         ifelse(Sub.Objective == 4 &
           Mix2==max(Mix2), Frequency,
         ifelse(Sub.Objective == 5 &
           Mix3==max(Mix3), Frequency,0))))),
      Proposal.Selection = ifelse(Proposal.Prob >= threshold &
              Proposal.Frequency ==
              max(Proposal.Frequency),
           TRUE, FALSE)) %>%
arrange(Store.Number, desc(Mix2)) %>%
ungroup( )
price.proposal$Benchmark.Price <- round(price.proposal$Benchmark.Price, digits=3)
price.proposal$Price.Proposal <- round(price.proposal$Price.Proposal, digits=3)
price.proposal$Actual.Cost
price.proposal$Actual.Margin <- round(price.proposal$Actual.Margin, digits=2)
price.proposal$AC.Change <- round(price.proposal$AC.Change, digits=2)
price.proposal$Probability <- round(price.proposal$Probability, digits=2)
price.proposal$Replacement.Cost <- round(price.proposal$Replacement.Cost,
digits=3)
price.proposal$Replacement.Margin <- round(price.proposal$Replacement.Margin,
           digits=2)
price.proposal$RC.Change <- round(price.proposal$RC.Change, digits=2)
price.proposal$Store.Number <- as.factor(price.proposal$Store.Number)
price.proposal <- price.proposal %>%
   group_by(Store.Number, Proposal.Selection) %>%
   mutate(Tie = ifelse(Proposal.Selection == TRUE & n( ) > 1, TRUE, FALSE),
     Tie.Margin = ifelse(Tie == TRUE, Replacement.Margin, 0)) %>%
   group_by(Store.Number) %>%
   mutate(Proposal.Selection =
       ifelse(Tie == FALSE, Proposal.Selection,
       ifelse(Tie == TRUE & Tie.Margin == max(Tie.Margin), TRUE, FALSE)),
     Proposal.Prob = ifelse(Proposal.Selection == TRUE, Probability, 0)) %>%
   ungroup( ) %>%
   mutate(Econ.Model.Price = ifelse(Proposal.Selection == TRUE, Price.Proposal, 0))
%>%
   group_by(Store.Number) %>%
   mutate(Econ.Model.Price = max(Econ.Model.Price)) %>%
   ungroup( )
prices <- price.proposal %>%
   filter(Proposal.Selection == TRUE) %>%
   select(Store.Number, Current.Store.Price, Price.Proposal, Price.Change,
     Position, Probability, Count, Position.Count, Frequency)
```

In another embodiment, the following code may be used to generate price proposals with handling for ties:

```
PRICE PROPOSAL
###################################################################
###################################################################
##############
proposal <- inner_join(naive_bayes, latest,
           by = c("Store", "RC_Move", "Market_Move"))
proposal <- proposal %>%
  mutate(Price_Proposal = Rounded_Market_Average + Position,
    Change = round(Price_Proposal - Store_Price, digits=2),
    Probability = round(Probability, digits=3))
proposal$Store_Day <- as.character(proposal$Store_Day)
proposal$Change <- as.numeric(proposal$Change)
followed_price_changes$Store <- as.numeric(followed_price_changes$Store)
followed_price_changes$Store_Day <-
as.character(followed_price_changes$Store Day)
followed_price_changes$Change <- as.numeric(followed_price_changes$Change)
Marking Followed Price Changes
proposal <- left_join(proposal, followed_price_changes,
           by=c("Store", "RC_Move", "Store_Day", "Change"))
proposal <- proposal %>%
  mutate(Followed_Price_Change =
      ifelse(is.na(Followed_Price_Change), FALSE, Followed_Price_Change))
%>%
  filter(Followed_Price_Change==FALSE) %>%
  arrange(Store, desc(Probability))
Modify the proposal table for the probability plot
proposal <- proposal %>%
  group_by(Store) %>%
  mutate(Replacement_Margin = Price_Proposal - Replacement_Cost,
    Frequency = round(Position_Count/sum(Position_Count),digits=2),
    Mix1 = ifelse(Probability >= setting_threshold,
        Replacement_Margin * Probability,0),
    Mix2 = ifelse(Probability >= setting_threshold,
        Replacement_Margin * Probability * Frequency, 0),
    Mix3 = ifelse(Probability >= setting_threshold,
        Probability * Frequency, 0),
    Proposal_Margin = ifelse(Probability >= setting_threshold,
          Replacement_Margin, 0),
    Proposal_Prob =
      ifelse(Sub_Objective == "Highest Probability" &
        Probability >= setting_threshold &
        Probability==max(Probability), Probability,
      ifelse(Sub_Objective == "Highest Margin" &
        Probability >=setting_threshold &
        Proposal_Margin==max(Proposal_Margin), Probability,
      ifelse(Sub_Objective == "Probability * Margin" &
          Mix1==max(Mix1), Probability,
        ifelse(Sub_Objective == "Probability * Margin * Frequency" &
            Mix2==max(Mix2), Probability,
          ifelse(Sub_Objective == "Probability * Frequency" &
              Mix3==max(Mix3), Probability,0))))),
    Proposal_Frequency =
      ifelse(Sub_Objective == "Highest Probability" &
        Probability >= setting threshold &
        Probability==max(Probability), Frequency,
      ifelse(Sub_Objective == "Highest Margin" &
        Probability >= setting threshold &
        Proposal_Margin == max(Proposal_Margin), Frequency,
      ifelse(Sub_Objective == "Probability * Margin" &
          Mix1==max(Mix1), Frequency,
        ifelse(Sub_Objective == "Probability * Margin * Frequency" &
            Mix2==max(Mix2), Frequency,
          ifelse(Sub_Objective == "Probability * Frequency" &
              Mix3==max(Mix3), Frequency,0))))),
    Proposal_Selection = ifelse(Proposal_Prob >= setting_threshold &
        Proposal_Frequency ==
        max(Proposal_Frequency),
      TRUE, FALSE)) %>%
  arrange(Store, desc(Mix2)) %>%
  ungroup( )
proposal$Probability <- round(proposal$Probability, digits=2)
proposal$Replacement_Cost <- round(proposal$Replacement_Cost, digits=3)
proposal$Replacement_Margin <- round(proposal$Replacement_Margin,
           digits=2)
proposal$RC_Trend <- round(proposal$RC_Trend, digits=2)
```

In an embodiment, the following code may be used to generate tables for output of the result to a user:

```
PLOT TABLES
################################################################
################################################################

Table to be displayed in the Shiny App
table <- price.proposal %>%
  select(Store.Number,
       Current.Store.Price, Econ.Model.Price, Price.Change,
       Probability, Position, Position.Count,
       Actual.Margin, Replacement.Margin,
       Actual.Cost, AC.Change, Replacement.Cost, RC.Change,
       Benchmark.Price, Market.Change,
       Objective, Sub.Objective) %>%
  mutate(Objective = ifelse(Objective == 1, "Volume", "Profit"),
     Sub.Objective =
       ifelse(Sub.Objective == 1, "Probability",
       ifelse(Sub.Objective == 2, "Margin",
       ifelse(Sub.Objective == 3, "Prob * Margin",
       ifelse(Sub.Objective == 4, "Prob * Margin * Frequency",
       ifelse(Sub.Objective == 5, "Prob * Frequency",NA)))))) %>%
  rename("Store" = Store.Number,
     "Current Price" = Current.Store.Price,
     "Econ Model Price" = Econ.Model.Price,
     "Selected Price Change" = Price.Change,
     "Times at Position" = Position.Count,
     "Current Actual Margin" = Actual.Margin,
     "Actual Cost" = Actual.Cost,
     "Replacement Cost" = Replacement.Cost,
     "Actual Cost Trend" = AC.Change,
     "Replacement Margin" = Replacement.Margin,
     "Replacement Cost Trend" = RC.Change,
     "Competitor Average" = Benchmark.Price,
     "Competitor Average Trend" = Market.Change,
     "Sub-Objective" = Sub.Objective)
proposal <- price.proposal %>%
  mutate(Probability = Proposal.Prob)
cost <- cost. move %>%
  select(Store.Number, Latest.AC.Move) %>%
  rename(AC.Move = Latest.AC.Move)
reaction.cost <- reaction.base %>%
  ungroup( ) %>%
  filter(Store.Change != 0, Change != 0) %>%
  group_by(Store.Number, Competitor.ID, AC.Move, Store.Change) %>%
  mutate(Total.Count = n( )) %>%
  ungroup( ) %>%
  group_by(Store.Number, Competitor.ID, AC.Move,
     Store.Change, Change) %>%
  mutate(Count = n(),
     Percentage = Count/Total.Count,
     Avg.Lag = round(mean(Lag), digits=0)) %>%
  select(Store.Number, Competitor.ID, AC.Move,
     Store.Change, Change, Total.Count, Count, Percentage, Avg.Lag) %>%
  arrange(Store.Number, desc(Competitor.ID), AC.Move, Store.Change) %>%
  unique( ) %>%
  rename(Costs = AC.Move) %>%
  ungroup( )
# Table used to deal with the render reaction error when the change has not taken
place
reaction.changes <- reaction.base %>%
  ungroup( ) %>%
  select(Store.Number, Store.Change)
reaction.cost$Avg.Lag <- as.numeric(reaction.cost$Avg.Lag)
reaction.cost$Competitor.ID <- as.factor(reaction.cost$Competitor.ID)
reaction.cost$Competitor.ID <- factor(reaction.cost$Competitor.ID,
          levels=rev(levels(reaction.cost$Competitor.ID)))
reaction.cost$Costs <- as.factor(reaction.cost$Costs)
reaction.cost$Costs <- factor(reaction.cost$Costs,
          levels=rev(levels(reaction.cost$Costs)))
#reaction.cost <- merge(reaction.cost, cost, by=c("Store.Number", "AC.Move"))
stores <- price.proposal %>% select(Store.Number) %>% unique( ) %>% ungroup( )
stores$Store.Number <- as.numeric(as.character(stores$Store.Number))
stores <- stores %>%
  arrange(Store.Number) %>%
  rename("Store Number" = Store.Number)
```

```
changes <- price.proposal %>%
  filter(Probability>=.5) %>%
  select(Price.Change) %>%
  arrange(Price.Change)
```

In an embodiment, the forecast model 640 may be performed using machine learning techniques for determining volume and/or other forecasts. In a forecast model process according to an embodiment, the store and competitors' weight price for the day may be determined similar to 1204 and 1208. In a further embodiment, benchmarks may be created for the lowest, average, and highest competitors, and the competitors may be ranked (e.g., based on geographic distances) similar to 1212.

The process may merge the store, competitor, and volume tables and determine variables, which may include: differentials between the store and benchmarks, categories for day of week, week, month, year, and leap-year, metrics for cost movement, market movement, volume averages, attainment to the volume target and holidays.

In an embodiment, the process may use machine learning with selected variables to generate volume forecasts (e.g., a combination of one or more variables). For example, variables may include store number, date, day of week, week month, holiday, store price (e.g., actual prices and/or the proposed price for the date to be forecasted), lowest competitor price, average competitor price, highest competitor price, a number of the closest competitors (e.g., 3), actual cost, actual margin, actual cost change, four-week volume average (same day of week), last year volume (same day of week), volume.

In a further embodiment, the process may determine the forecast as adjusted by a baseline. For example, the sales volume may be related to seasonality (e.g., days of the week) as discussed above in this disclosure (e.g., with respect to Tables 2A and 2B). Therefore, a sales volume baseline may be determined using some average sales volume (e.g., rolling average) of the data adjusted by the seasonality. The volume forecast may be determined as a projection of the volume baseline adjusted by the seasonality or other factors.

In an embodiment, the following code may be used to determine the volume baseline, profit baseline, and the objective achievement variables:

```
##BASELINES
###############################################################

position_base <- position_base %>%
  # Volume Baseline
  group_by(Store, Day) %>%
  mutate(Profit = ifelse(Bad_Replacement_Cost==TRUE,NA,
         ifelse(Bad_Volume==TRUE,NA,Replacement_Margin * Volume)),
    Day_Avg = roll_mean(Volume, n=5, na.rm=TRUE, align="right",
fill=NA))%>%
  group_by(Store) %>%
  arrange(Store, Date) %>%
  ## Starting two days back because volume for yesterday are not consistently
available
  mutate(Run_Rate_Week = roll_mean(Volume, n=30, na.rm=TRUE, align="right",
fill=NA)*7,
    Day_Percent = Day_Avg/Run_Rate_Week,
    Volume_Baseline = Day_Percent * Run_Rate_Week,
    Volume_Attainment =
ifelse(Bad_Volume==TRUE,NA,Volume/Volume_Baseline),
    Target_Attainment = Volume/Volume_Target,
    Volume_Baseline_Error = Volume_Baseline - Volume,
    # Subracting 28 below to account for the 28 days needed to generate the forecast
    Volume_RMSE = sqrt(sum(Volume_Baseline_Error^2, na.rm=TRUE)/(n( )-
28)),
    Volume_RMSE_Percent = Volume_RMSE / mean(Volume, na.rm=TRUE))
%>%
  # Profit Baseline
  group_by(Store) %>%
  mutate(Volume_Baseline_Mean = mean(Volume_Baseline, na.rm=TRUE),
    Profit_Mean = mean(Profit, na.rm=TRUE),
    Abs_Profit_Mean = mean(abs(Profit), na.rm=TRUE)) %>%
  group_by(Store, RC_Move, Market_Move, Month) %>%
  mutate(Market_Margin_Mean_Diff = mean(Replacement_Margin-Market_Margin,
na.rm=TRUE),
    Margin_Metric = Market_Margin + Market_Margin_Mean_Diff,
    Profit_Baseline = Volume_Baseline * Margin_Metric,
    Profit_Attainment = Profit/Profit_Baseline,
    Profit_Baseline Error = Profit-Profit_Baseline) %>%
  group_by(Store) %>%
  mutate(Profit_RMSE = sqrt(sum(Profit_Baseline_Error^2, na.rm=TRUE)/(n( ))),
    Profit_RMSE_Percent = Profit_RMSE / Abs_Profit_Mean) %>%
  ungroup( ) %>%
  # Objective Achievement Variables
  mutate(Avg_Volume_RMSE = mean(Volume_RMSE_Percent, na.rm=TRUE),
    Avg_Profit_RMSE = mean(Profit_RMSE_Percent, na.rm=TRUE),
    Company_Avg = mean(Volume, na.rm=TRUE),
```

```
Achieved_Volume_Target = as.factor(
    ifelse(Target_Attainment < 1, 0, 1)),
Achieved_Volume_Baseline =
    ifelse(Volume_Attainment >=1, 1, 0),
Achieved_Profit_Baseline =
    ifelse(Profit_Attainment < 1, 0, 1),
Objective_Attainment =
    ifelse(Objective == "Volume", Achieved_Volume_Baseline,
        ifelse(Objective == "Profit", Achieved_Profit_Baseline,NA)))
```

FIG. 10A-10H show exemplary graphical user interfaces for a price optimization system according to an embodiment.

The graphical user interface (GUI) as shown in FIGS. 10A-10H may include graphical outputs in the form of graphs and charts for displaying the information including predictions and/or other data through the processing of one or more of the reaction model 620, positioning model 630, and forecast model 640. The various displays of the GUI may also be color-coded. In an embodiment, the GUI may include selectors or other inputs for the user to select for the display of other information and/or to change conditions or settings to the price optimization system.

Figure 10A:
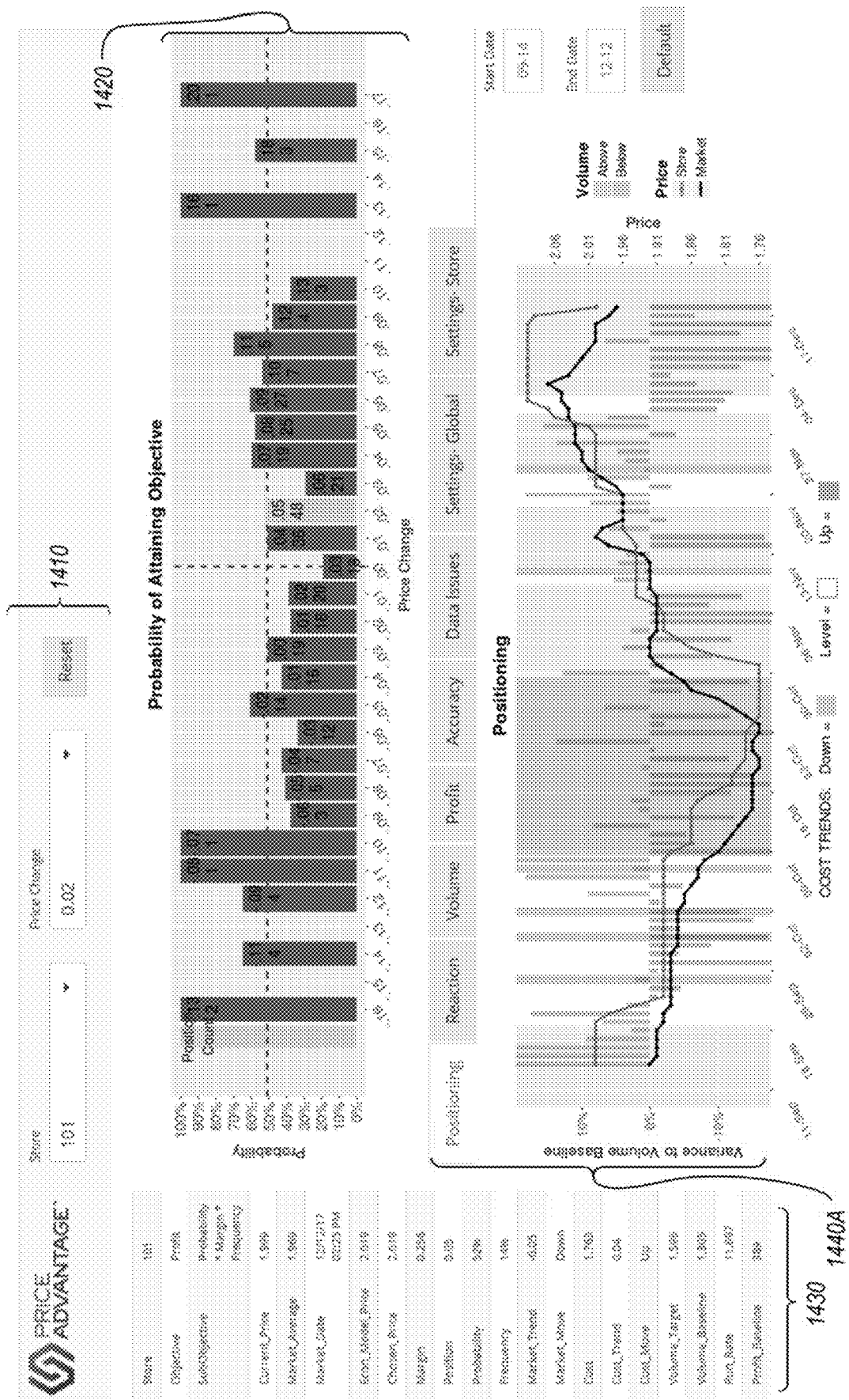
FIG. 10A-10H show exemplary graphical user interfaces for a price optimization system according to an embodiment.
Figure 10B:
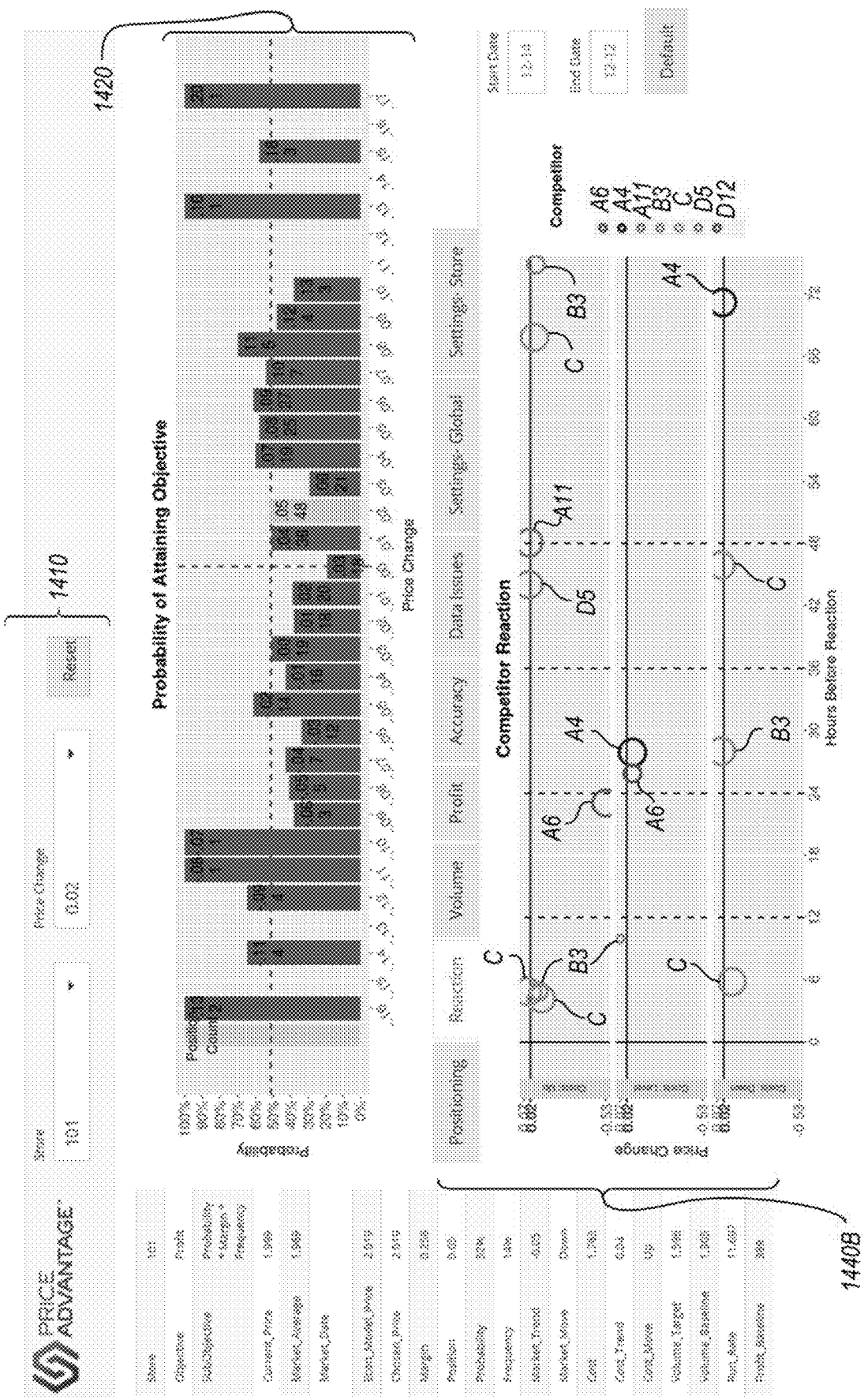
Figure 10C:
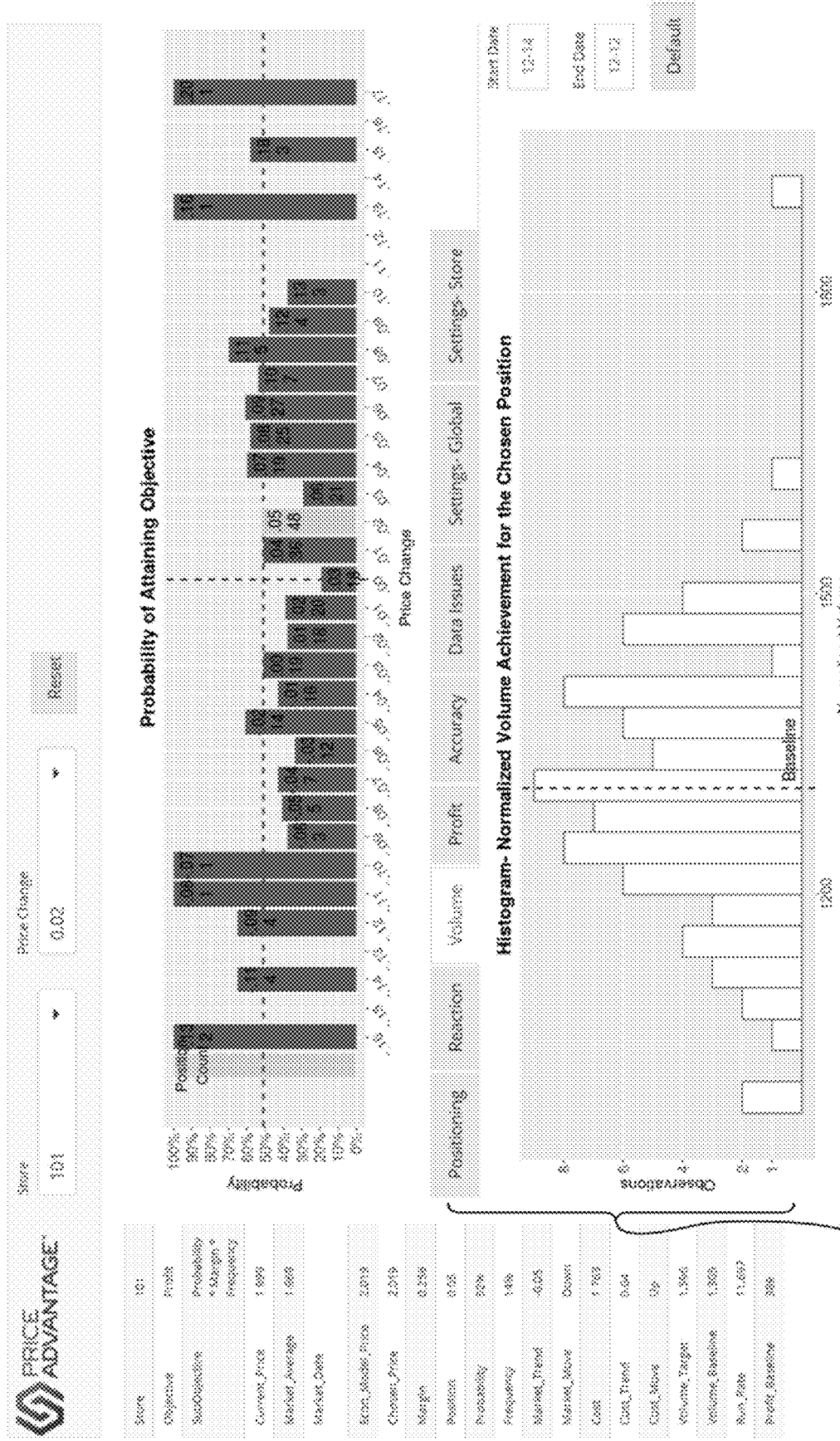
Figure 10D:
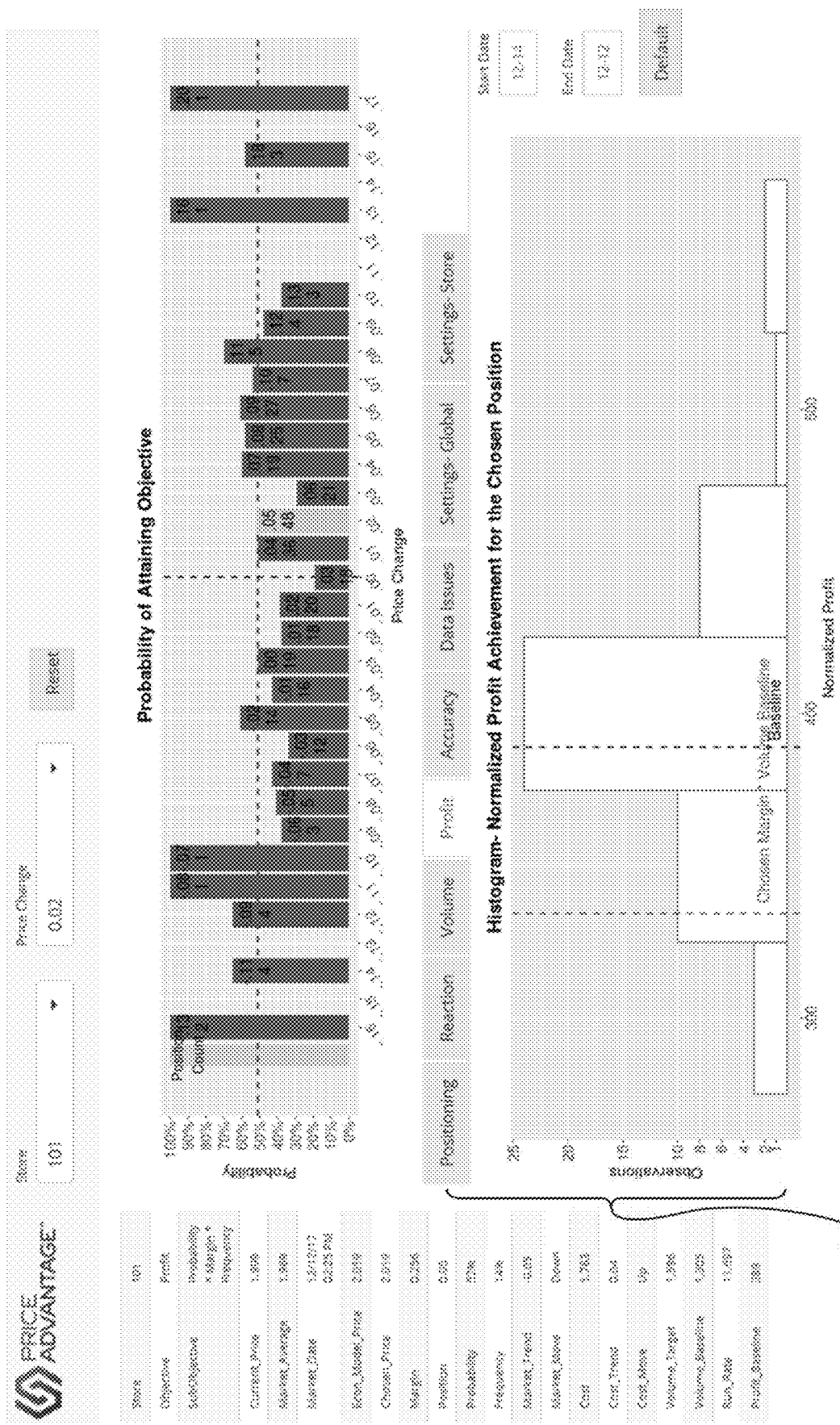
Figure 10E:
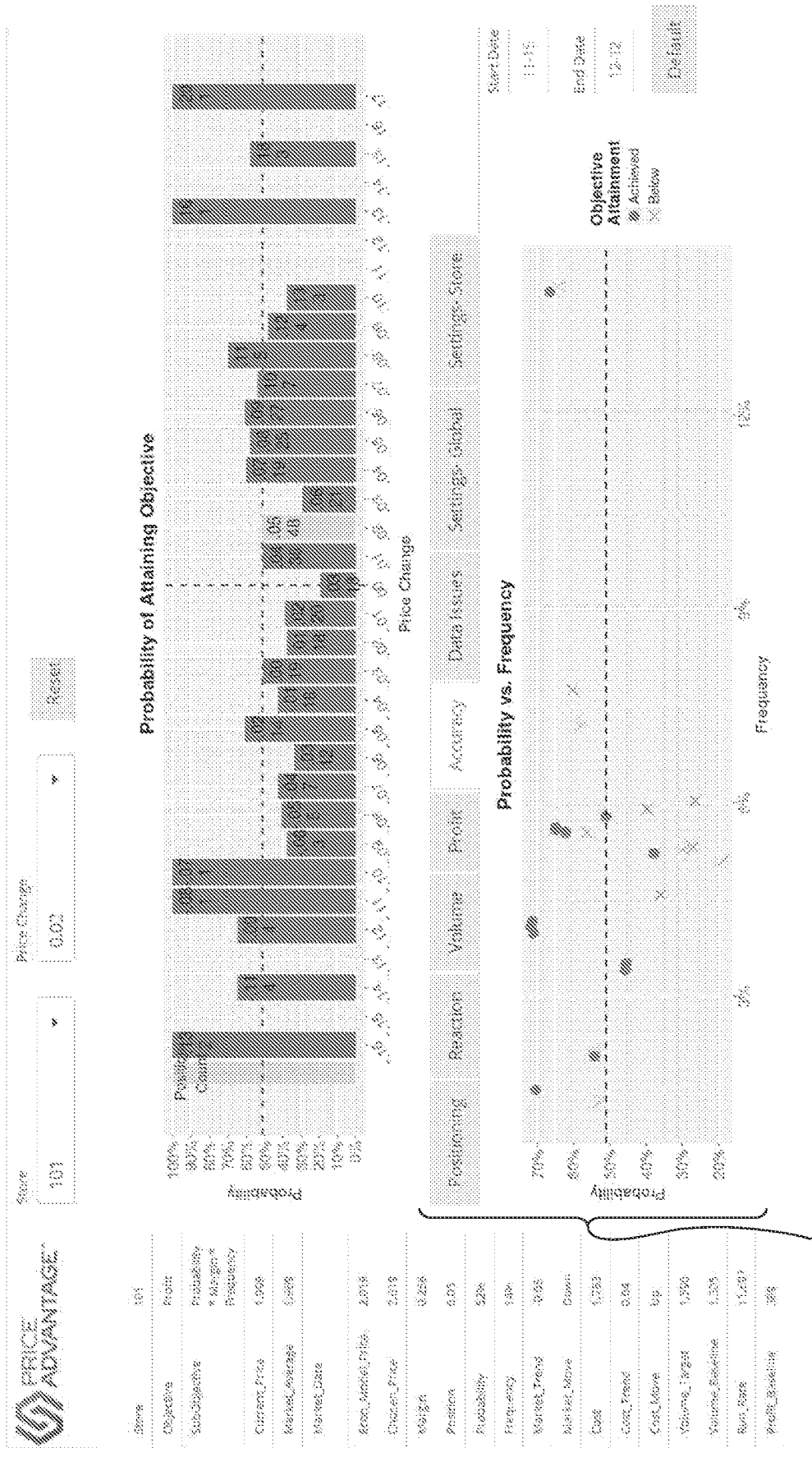
Figure 10F:
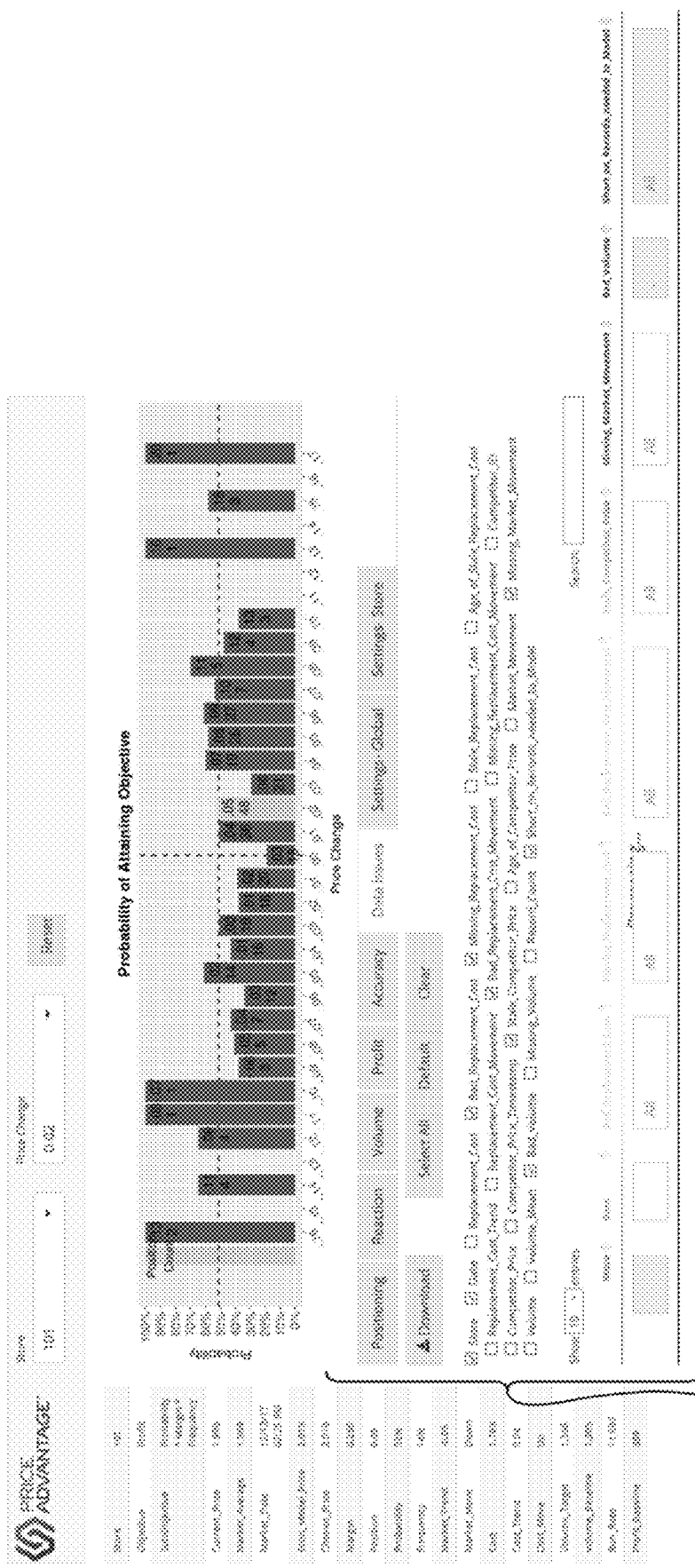
Figure 10G:
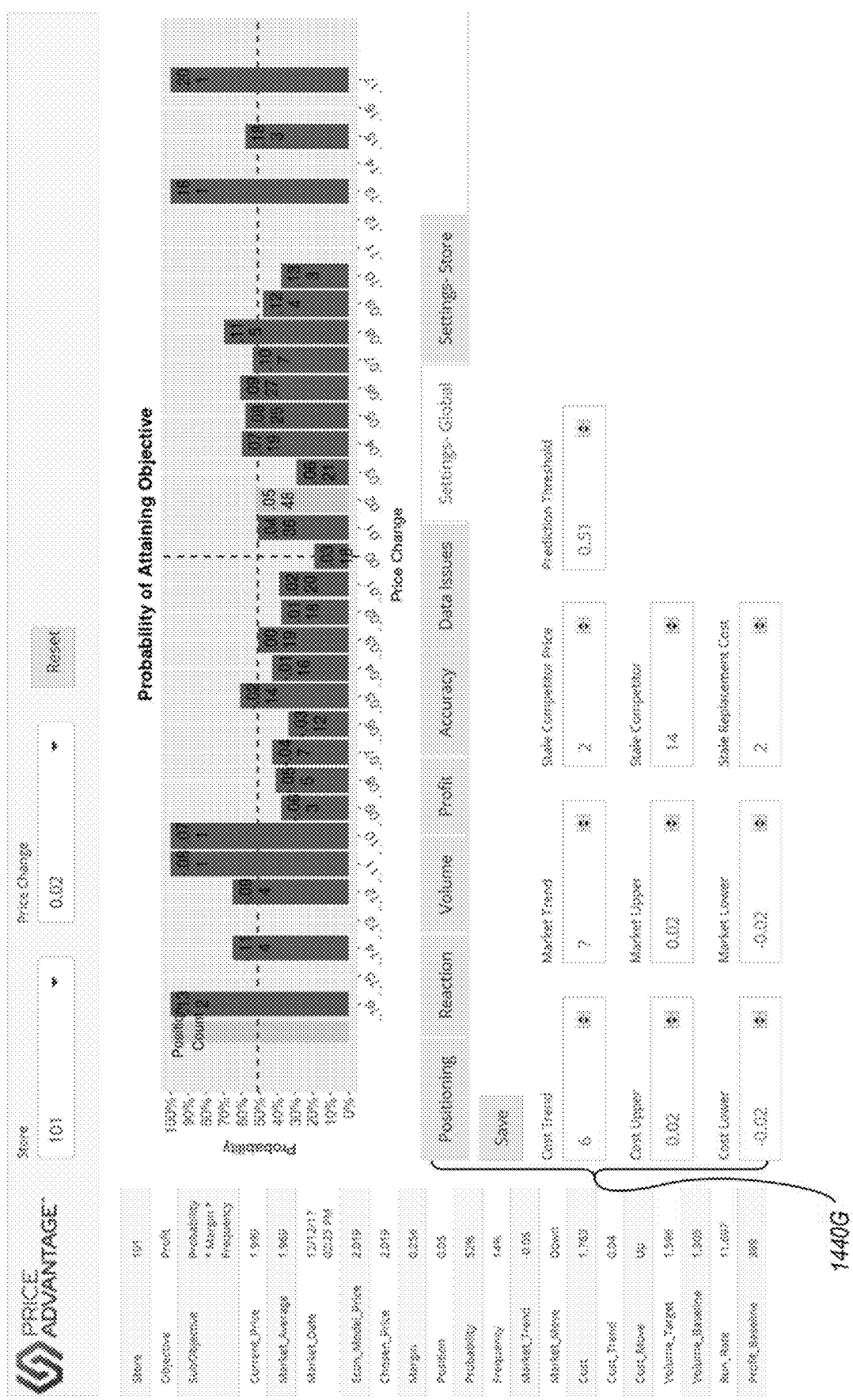
Figure 10H:
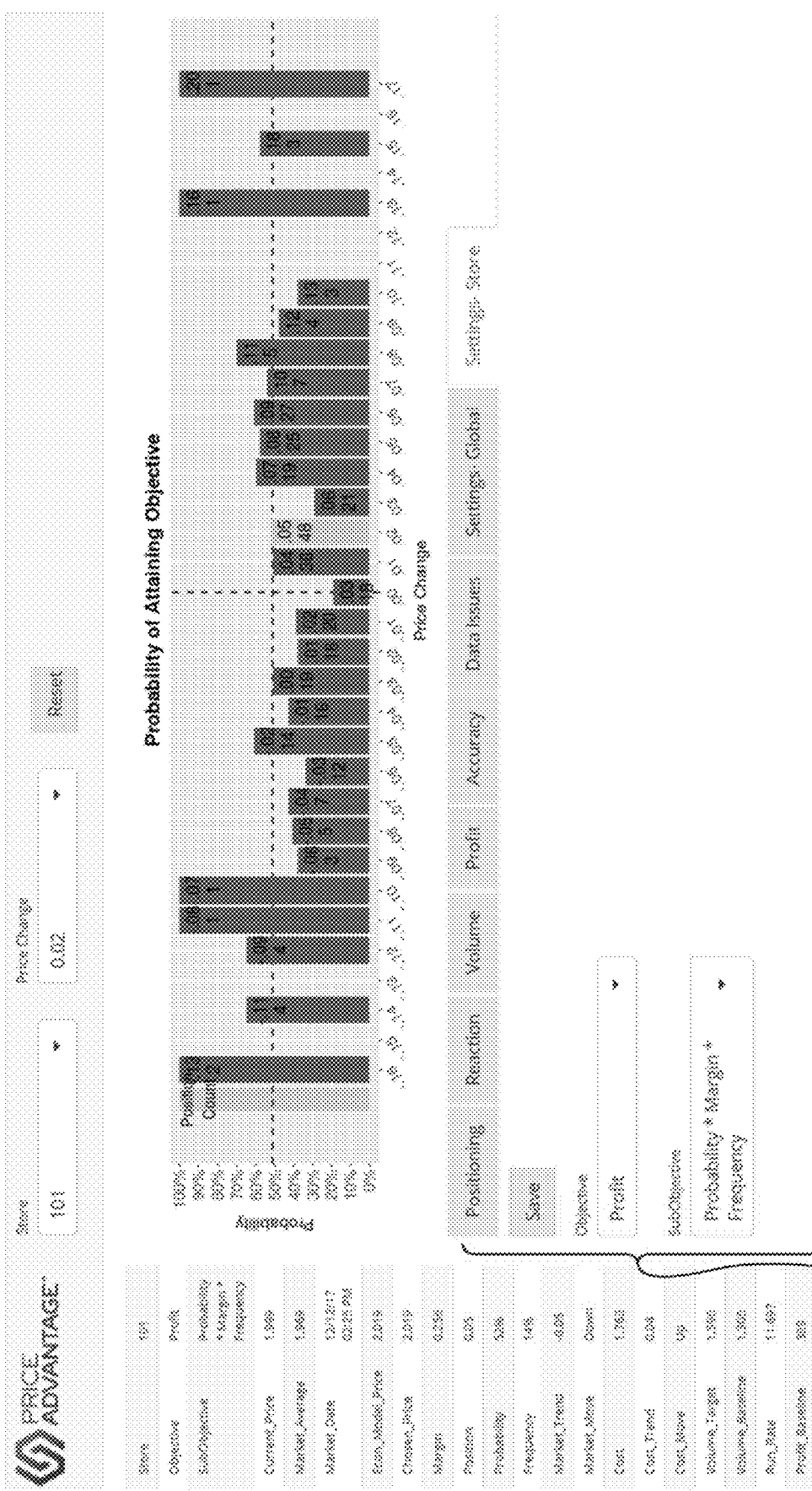

Referring to FIG. 10A, the GUI may include a portion 1410 for the selection of a store and/or a price change to the price optimization system by the user. For example, the user may manage one or more different stores. The user may view the determinations of the price optimization system for each of the stores and a range of interested price changes for the store. In an embodiment, the GUI may default to a store and/or a price change that satisfies the objective and/or the sub-objective (e.g., when the user first accesses the GUI without entering any input or when the GUI is reset).

The GUI may include a portion 1420 for showing the determined probabilities for attaining the set objective (or sub-objective) through various price changes. In an embodiment, the portion 1420 may output the probabilities as determined by the price optimization system through one or more or a combination of the reaction model 620, positioning model 630, and volume forecast model 640.

The portion 1420 may output the probability of attaining the set objective (or sub-objective) in a graph format. For example, the graph may plot the probabilities of attaining the objective in the y-axis against various price changes in the x-axis. Each instance of the price changes may be plotted as a bar in the graph, with the bar for the currently selected price change (e.g., from the portion 1410) highlighted. Each bar may further include other information such as the price position for the bar and the count for the number of times the data (e.g., historical data from which the analysis of price optimization system is based) has been at such a price position.

Referring to the position in GUI for example, the price change of +$0.02 is currently selected. At a current price of $1.999 for the store 101 and a current market average price of $1.969 (where there is a price difference of $0.03 between the current price for the store 101 and the market average price), the price position for the +$0.02 price change is +$0.05. The data has been at this price position 48 times previously.

In an embodiment, the information shown in portion 1420 may be determined from one or more or a combination of the reaction model 620, positioning model 630, and volume forecast model 640 (e.g., as discussed above in this disclosure).

The GUI may include a portion 1430 for showing further details regarding the analysis of the price optimization system. In an embodiment, the portion 1430 may include selections by the user (e.g., selections from portion 1410), relevant global or store settings (e.g., settings from portions 1440G and 1440H shown in FIGS. 10G and 10H), and information based on the selections and settings. The information in portion 1430 may be shown in numerical form.

Referring to portion 1430 for example, the store 101 is selected. The objective of profit (e.g., maximizing or at least attaining an acceptable or target amount of profit) with a sub-objective of attaining a certain probability for the objective (e.g., probability*margin*frequency) may be selected by the user (e.g., through portion 1440H).

Here, the price change of +$0.02 is determined to be the price change that would be the optimal price change to satisfy the sub-objective. For example, as shown in the graph of portion 1420, while the price changes of −$0.13, −$0.08, −$0.07, +$0.016, and +$0.20 all have a probability of 1 in attaining the objective (e.g., an acceptable profit based on a profit baseline), these price changes have minimal data basis (e.g., the −$0.13 have two previous instances in the analysis data while the other price changes each has only one previous instance). Therefore, the price change of +$0.02, having a probability for attaining the objective of 52%, a profit margin of $0.256 (at a chosen price of $2.019 and an inventory cost of $1.763), and a data frequency basis of 48 instances (which is 14% of the data) is determined to be optimal in attaining the sub-objective. In an embodiment, the sub-objective may be an option for a store to price the fuel or other goods or services with reasonable user expectation of optimizing profit while avoiding extreme price changes that have inadequate support data (e.g., avoiding the outliers or other statistical anomalies). In another embodiment, other data correction (e.g., filtering) may be used (such as determining unattainable positions within one or more of the models as discussed above in this disclosure).

In an embodiment, another economic model may be used to obtain other predicted prices based on the economic model. Such other predicted prices may be compared with the price determined by the price optimization system.

In an embodiment, portion 1430 may include other information from the analysis of the price optimization including one or more of the market trend of the price (and movement direction), cost, cost trend, and cost movement, and the volume baseline (e.g., taking into account seasonality or other factors as discussed above in this disclosure) and the volume target (which may be set by the user).

The GUI may include a portion 1440A for showing one or more of a variance of store volume sale to a volume baseline, the pricing of the store and market, and a trend of costs of acquiring stock, in the y-axis, against a domain of dates in the x-axis, in a graph. For example, the volume baseline may be determined through the models (e.g., taking into account seasonality or other factors as discussed above in this disclosure), and the variance to the volume baseline may be plotted at bars extending above or below the volume baseline for each date. The cost trends may be plotted as a pattern or color for each range of dates that have cost trends of being level, trending downward, or trending upward. The cost trend range for being level, trending downward, or trending upward may be further defined by the user (e.g., defining the minimal change (e.g., $0.02) in cost to be considered level or trending either upward or downward, which may be set as a global setting in portion 1440G). In an embodiment, the graph may be color coded.

In an embodiment, the domain of dates may be chosen by the user or may be set to a default range (e.g., the past three months).

Referring to FIGS. 10B-10H, the GUI may include other portions 1440B to 1440H for displaying other outputs of the price optimization system or allowing other inputs from the user. In an embodiment, the portions 1440B to 1440H may be accessed by tab buttons and may replace the portion 1440A (or other portions) in the GUI display.

In an embodiment, the portion 1440B may show the competitor's reaction (in the form of a price change) to the selected price change at the selected store (e.g., based on data used in the analysis by the price optimization system. The competitor's reaction may be displayed in the form of one or more plots of the competitor's reaction price change in the y-axis and the lag time (e.g., in hours) of the competitor's reaction price to the store's price change in the x-axis. In an embodiment, the competitor's reaction may be plotted on separate graphs based on one or more additional factors (e.g., separate graphs for when the cost is level, trending up, and trending down).

In an embodiment, the competitor's reaction plot may be separately plotted for each of the competitor's store (e.g., the stores nearby) or multiple competitor's stores may be combined as a group (e.g., stores of the same chain that are geographically nearby). In an embodiment, the size of the marking circle may indicate a confidence to the predicted reaction (e.g., based on known reaction percentage from the data (e.g., the ratio of times a competitor reacted as indicated to a store's price change)). In an embodiment, certain competitors or group of competitors may be selected to be included or excluded in the plot.

In an embodiment, the competitor's reaction plot may be color coded (e.g., based on the competitor or other basis).

In the example for portion 1440B, each of the competitors' stores (e.g., within a geographical area) are group based on their store chains. For example, stores A6, A4, and A11 are within one store chain; store B3 is one store (e.g., within the geographical area) of a store chain; store C is an individual store with no corresponding store chain; and stores D5 and D12 are within another store chain.

Further in the example plot in the portion 1440B, the plot shows that store C has instances of price change (shown by the labelled circles) of around +$0.02 or less around 6 hours after the store's +$0.02 price change (and another circle of the same +$0.02 price change after around 46 hours and 71 hours of the store's +$0.02 price change). This may be interpreted by the user as a likely reaction (or at least a factor) that the store's price change +$0.02 would induce store C's reaction to change its price the similarly or a lower price. Also, store C's reaction does not vary greatly due to cost movement or trend (e.g., store C's costs down plot is around the same price change and hours before reaction as the costs up plot). Further, store C's plot circles are large circles, which indicate that the price optimization determines a high probability (e.g., based on a high probability of previous reactions) that store C would react similarly. This information may provide the user with likely price change reaction, time before the price change reaction, and/or the degree of confidence in the system's determination.

The exemplary plot also shows store B3's probable reactions to the store's price change. However, since some of store B3's circles are smaller, this indicates that probability of store B3's plotted reactions are lower (e.g. a lower confidence in the plotted reaction).

The exemplary plot shows that store D12 lowered the price by −$0.53 after around 24 hours of the store's price change at +$0.02 with high probability with the costs is trending upward, but did not have the same price change when the costs is staying level. A user may interpret this as that the store's price change is not a cause (or at least not a predominately cause) for store D12's price change. Further, the high probability of the price change of −$0.53 may be due to a low frequency of the event in the data (e.g., only one such event in the data).

Each of the stores A6, A4, A11, B3, C, D5, and D12 may be color-coded using the same color for each store in the plot (in lieu of or in conjunction with the labels) according to an embodiment. Each of the store chains and/or individual stores without store chains may be color-coded by group in the plot (e.g., using similar, complementary, similar shadings, etc.).

The GUI may include a portion 1440C for showing the normalized volume achievement for the chosen position. The portion 1440C may be plotted as a histogram with the number of observations (e.g., past instances in the data) in the y-axis and the normalized volume (e.g., normalized by seasonality as discussed above in this disclosure) in the x-axis.

The GUI may include a portion 1440D for showing the normalized profit achievement for the chosen position. The portion 1440D may be plotted as a histogram with the number of observations (e.g., past instances in the data) in the y-axis and the normalized profit (e.g., normalized by seasonality or other factors as discussed above in this disclosure) in the x-axis. In an embodiment, the profit or normalized profit may be determined as a function of the chosen margin (e.g., $0.256 here based on a price change of +$0.02) multiply by the volume baseline.

The GUI may include a portion 1440E for showing a comparison of the probability for attaining the objective to the frequency of the data for each of the price changes. The portion 1440E may be plotted as a graph with the probability of attaining the objective in the y-axis and the frequency of the data for each of the price changes in the x-axis.

The GUI may include a portion 1440F for showing the data used for the price optimization system (e.g., the raw data in the form of tables). In an embodiment, the user may select the data based on categories and/or ranges.

The GUI may include a portion 1440G for showing settings that the user may edit. In an embodiment, the user may edit ranges of costs or market prices that may be considered level, trending upward or downward. The user may also edit ranges (e.g., in days) where the competitor's price, replacement costs, or other factors as being stale (e.g., presumption of no updated data or incorrect or bad data to be accounted for). The user may also edit the prediction threshold to be considered as acceptable (e.g., 51%).

The GUI may include a portion 1440H for showing objective and sub-object settings that user may edit. In an embodiment, the objective may include profit or volume or other factors. Exemplary sub-objectives may include:

Probability*Margin*Frequency, Highest Probability, Highest Margin, Probability*Margin, and Probability*Frequency.

To avoid unnecessarily obscuring the present disclosure, the preceding description may omit a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on a programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for fuel price optimization for a product or service at for one or more fuel stores, comprising:

obtaining historical fuel prices, through a network, from one or more information sources, the historical fuel prices including a fuel price for each day of a set of days within a time period for the one or more of the fuel stores and the one or more of competitors' fuel stores;

obtaining historical fuel volume data for the set of days for the one or more of the fuel stores and the one or more of the competitors' fuel stores;

aggregating fuel price positions for the set of days for the one or more fuel stores compared with the one or more competitors' stores based on the historical fuel prices, wherein the fuel price positions include frequencies of fuel price differences between the one or more fuel stores and the one or more competitors' stores;

determining, using computational equipment, (a)-(c) following:

(a) probabilities for respective changes in a present fuel price for the one or more competitors' fuel stores, based on respective changes in a present fuel price for the one or more fuel stores, wherein the probabilities are output of a reaction model, wherein the reaction model is processed based on the historical fuel prices, fuel price positions, the historical fuel volume data, and a determined lag time of relational past fuel price changes between the one or more fuel stores and the one or more competitors' stores, and wherein the output includes confidences for the changes as determined by the reaction model;

(b) conditional probabilities for the one or more fuel stores to attain respective objectives based on profits or volume of fuel sold at the one or more fuel stores, wherein the conditional probabilities are output of a positioning model, and wherein the positioning model is processed based on the historical fuel prices, the historical fuel volume data, the fuel price positions, and one or more variables for the set of days, the variables including pre-determined trend data for market conditions of fuel;

(c) fuel volume forecasts for the one or more fuel stores, wherein the fuel volume forecasts are output of a forecast model, wherein the forecast model is processed through a machine learning system trained for correlation with one or more of the following inputs for generation of fuel volume forecast: store number, date, day of week, week, month, holiday, store price, lowest competitor price, average competitor price, highest competitor price, closest competitor prices, differentials with competitors prices, actual cost, actual margin, actual cost change, volume average, replacement margin, replacement cost, replacement cost change, last year volume, and volume;

presenting, in a graphical user interface (GUI), at least some of the conditional probabilities with the respective price changes, wherein, for a selected one of the price changes, further presenting, in one graph or plot, at least some of the probabilities with the respective price changes and a time of predicted competitor's reaction for the respective price changes and an indication of the respective confidence for the respective price changes; and transmitting, through a network, to the one or more fuel stores, data for automatically changing a machine-controlled fuel sign and a point of sale system at the one or more fuel stores with a selected fuel price, wherein the selected fuel price is selected based on at least one of the probabilities and the conditional probabilities.

2. The method of claim 1, wherein the respective objectives comprises one or more subobjectives based on a margin of the price proposal and a frequency of a price of the price proposal in the fuel prices.

3. The method of claim 1, further comprising filtering at least one of the fuel prices and the variables based on information indicative of seasonality.

4. The method of claim 1, wherein the presenting further comprises presenting in one graph or plot for different conditions of a factor.

5. The method of claim 4, wherein the factor comprises cost movement.

6. The method of claim 1, the indication comprises a diameter of a circle where the larger the diameter of the circle the more probable the indication and the smaller the diameter of the less probable the indication.

7. The method of claim 1, wherein the plot or graph is color-coded.

8. The method of claim 1, wherein at least two or more of the one or more competitors' stores are grouped as one or more store chains.

* * * * *

UNITED STATES PATENT AND TRADEMARK OFFICE
CERTIFICATE OF CORRECTION

Page 1 of 1

PATENT NO. : 10,984,433 B1
APPLICATION NO. : 15/961506
DATED : April 20, 2021
INVENTOR(S) : Brendan S. Doner It is certified that error appears in the above-identified patent and that said Letters Patent is hereby corrected as shown below:

In the Claims

Column 63 Claim 1, Lines 32-33, replace "A method for fuel price optimiztion for a product of service at for" with -- A method for fuel price optimization for --

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*